(12) United States Patent
Bala et al.

(10) Patent No.: US 6,333,799 B1
(45) Date of Patent: Dec. 25, 2001

(54) HYBRID WAVELENGTH-INTERCHANGING CROSS-CONNECT

(75) Inventors: Krishna Bala, New York, NY (US); Gee-Kung Chang, Holmdel; Robert R. Cordell, Middletown, both of NJ (US)

(73) Assignee: Tellium, Inc., Oceanport, NJ (US)

( * ) Notice: Subject to any disclaimer, the term of this patent is extended or adjusted under 35 U.S.C. 154(b) by 0 days.

(21) Appl. No.: 09/003,117

(22) Filed: Jan. 6, 1998

Related U.S. Application Data

(60) Provisional application No. 60/035,784, filed on Jan. 7, 1997.

(51) Int. Cl.[7] .................................................. H04J 14/02

(52) U.S. Cl. ............................................ 359/128; 359/117

(58) Field of Search .................................... 359/110, 117, 359/123–124, 128, 135, 139; 385/16, 24

(56) References Cited

U.S. PATENT DOCUMENTS

| | | | |
|---|---|---|---|
| 5,002,349 | 3/1991 | Cheung et al. | 350/96.13 |
| 5,414,540 | 5/1995 | Patel et al. | 359/39 |
| 5,414,541 | 5/1995 | Patel et al. | 359/39 |
| 5,434,700 | 7/1995 | Yoo | 359/332 |
| 5,457,556 | 10/1995 | Shiragaki | 359/117 |
| 5,751,454 | * 5/1998 | McDonald et al. | 359/119 |
| 5,802,232 | 9/1998 | Bhat et al. | 385/122 |
| 5,825,517 | 10/1998 | Antoniades et al. | 359/117 |
| 6,084,694 | * 7/2000 | Milton et al. | 359/124 |

FOREIGN PATENT DOCUMENTS

| | | | |
|---|---|---|---|
| 0 721 275 | 10/1996 | (EP) | H04M/3/36 |
| WO 97/21289 | 6/1997 | (WO) . | |
| WO 97/29999 | 8/1997 | (WO) . | |

OTHER PUBLICATIONS

Hill, G.R., et al, "A Transport Network–Layer Based on Optical Network Elements", *Journal of Lightwave Technology*, vol. 11, No. 5/6, May/Jun. 1993, pp. 667–679.

Alexander, S.B., et al., "A Precompetitive Consortium on Wide–band All–Optical Networks", *Journal of Lightwave Technology*, vol. 11, No. 5/6, May/Jun. 1993, pp. 714–735.

Iqbal, M.Z., and Chang, G.K., "High Performance Optical Switches For Multiwavelength Rearrangeable Optical Networks", Government Microcircuit Application Conference, San Diego, CA, Nov. 1994, pp. 475–477.

Bala, K., et al., "The Case for Opaque Multiwavelength Optical Networks", *1995 Digest of the LEOS Summer Topical Meetings at Keystone Resort*, Keystone, CO, Aug. 7–11, 1995, pp. 58–59.

(List continued on next page.)

*Primary Examiner*—Leslie Pascal
(74) *Attorney, Agent, or Firm*—Morgan, Lewis & Bockius LLP

(57) ABSTRACT

A wavelength-interchanging cross-connect for a wavelength-division multiplexing (WDM) optical communication system including both transparent optical paths and opaque paths through an electronic switching network, such as a high-speed digital cross-connect switch (DCS), including matching opto-electronic conversions of the data signal. All-optical switching is performed on the input and output sides, for example, by mechanically actuated fiber switches. The DCS, receiving optical inputs from the input optical switches and providing optical outputs to the output optical switches, performs switching in the electrical domain and can perform wavelength conversion of the signals passing through it. The DCS also provides for access to electrical add/drop lines for interfacing to a client. The transparent optical path, which can be either direct or through an optical switch, transfers a signal without regard to its format from the input to the output of the switching system. An algorithm is available for setting up the required connection through the different components.

5 Claims, 18 Drawing Sheets

OTHER PUBLICATIONS

Ford, Joseph E., et al., "Wavelength–Selectable Add/Drop With Tilting Micromirrors", Postdeadline Papers: LEOS '97—10th Annual Meeting of the IEEE Lasers and Electro–Optics Society, San Francisco, CA, Nov. 10–13, 1997, pp. 1–2.

Chang, C.E., et al. "40 Gb/s WDM Cross–Connect with an Electronic Switching Core: Preliminary Results from the WEST Consortium", Conference Proceedings: LEOS '97—10th Annual Meeting of the IEEE Lasers and Electro–Optics Society, San Francisco, CA, vol. 2, Nov. 10–13, pp. 336–337.

Fujiwara, "Advanced Photonic Switching Technology for Communications," IEICE Transactions on Communications, vol. E78–B, No. 5, pp. 644–653, May 1995.

Lee et al., "Routing and Switching in a Wavelength Convertible Optical Network," IEEE Infocom '93 Conference: Networking: Foundation for the Future, vol. 2, pp. 578–585, Mar. 28, 1993.

Zhou et al., "Cross Talks in Multiwavelength Optical Cross–Connect Networks," Optical Fiber Communication '95: Summaries of Papers Presented at OFC '95 Conference, Feb. 26–Mar. 3, 1995, pp. 278–280, Feb. 26, 1995.

Chang et al., "Multiwavelength Reconfigurable WDM/ATM/SONET Network Testbed," Journal of Lightwave Technology, vol. 14, No. 6, pp. 1320–1340, Jun. 1996.

Okamoto et al., "Optical Path Cross–Connect Node Architectures for Photonic Transport Network," Journal of Lightwave Technology, vol. 14, No. 6, pp. 1320–1340, Jun. 1996.

Brackett et al., "A Scalable Multiwavelength Multihop Optical Network: A Proposal for Research on All–Optical Networks," Journal of Lightwave Technology, vol. 11, No. 5/6, May/Jun. 1993.

* cited by examiner

HYBRID WAVELENGTH-INTERCHANGING CROSS-CONNECT

RELATED APPLICATIONS

This application claims the benefit of U.S. Provisional Application 60/035,784, filed Jan. 7, 1997.

FIELD OF THE INVENTION

The invention relates generally to optical communication networks. In particular, the invention relates to a combination of all-optical and opto-electronic elements for interchanging wavelengths at a node in the network.

BACKGROUND ART

Optical fiber is becoming the transmission medium of choice for communication networks. The bandwidth of well designed optical fiber is measured in the hundreds of terahertz, and the system capacity is limited not by the fiber but by the electronics at its ends. Fiber's attenuation can be reduced to a level allowing transmission over hundreds of kilometers without regeneration or amplification. Fiber further is largely immune to electronic noise.

Optical fiber was originally used as a point-to-point replacement for electrical cable, such as coaxial cable. In this architecture, at the transmitter end of the fiber, a data signal modulates a laser emitting its light of a well defined wavelength into the fiber. At the receiver end of the fiber, a detector detects the intensity envelope of the light, thus converting the transmission signal back from the optical domain to the electrical domain. It was early recognized that the fiber capacity could be significantly increased by wavelength-division multiplexing (WDM). A plurality W of lasers of differing emission wavelengths are modulated by separate data signals, and their outputs are combined (multiplexed) onto a single fiber. At the receiver end, an optical demultiplexer separates the W-wavelength signal into W separate optical paths according to wavelength. A detector is associated with each optical path so that the W detectors output W electrical signals. However, the described WDM optical transmission system without additional specialized elements is a point-to-point system having optical fibers connecting two nodes with an opto-electronic conversion being required at each node. If an optical signal is to be transmitted through the node, the node may act as a regenerator in detecting the received optical signal, converting it to an electrical signal, and using the electrical signal to generate a new optical signal for transmission, and the regeneration is required even if the optical signal will transit the node without change.

The principle advantage of fiber is its low-cost bandwidth. However, multiplexers, demultiplexers, opto-electronic converters, and high-speed electronics associated therewith are expensive, and regenerators are replete with such elements. Further, the electronic design of regenerators typically depends strongly upon the format of the signal and its bit rate. As a result, any upgrade in data rate or conversion to a different signal type requires significant changes at each node of the network, thus greatly increasing the cost of any such change.

Brackett et al. have suggested an all-optical network to solve some of these problems, as described in "A scalable multiwavelength multihop optical network: A proposal for research on all-optical networks," *Journal of Lightwave Technology*, vol. 11, no. 5/6, 1993, pp. 736–753. In one type of an all-optical network 10, illustrated in the network diagram of FIG. 1, a number of nodes 12, designated respectively as A, B, C, D, E, transmit and receive respective multi-wavelength WDM signals onto and from the network 10. Three wavelengths $\lambda_1$, $\lambda_2$ $\lambda_3$ are illustrated, but the number W of wavelengths may vary both between networks and over time on a single network 10. The network 10 includes a web of optical fibers 14 between wavelength-selective cross-connects (WSXCs) 16 and between the wavelength-selective cross-connects 16 and the nodes 12. The figure illustrates the WDM paths, not the fibers. Ignoring complexities like anti-parallel fibers for bidirectional transmission, very high-capacity links, and multi-fiber self-healing networks, two or more WDM signals are assumed to be carried in one direction between nodes 12 and WSXCs 16 on a single fiber. Importantly, the wavelength-selective cross-connects 16 can receive a W-wavelength WDM signal and switch its wavelength components in different directions without the need for converting the WDM optical signal to electrical form. For example, the A node 12 can transmit two signals of wavelengths $\lambda_1$, $\lambda_3$ over a single fiber 14. The wavelength-selective cross-connects 16 can switch the two wavelength signals at $\lambda_1$, $\lambda_2$ separately to the B and E nodes 12 according to the wavelength. That is, the switching is all-optical, and the opto-electronic conversion is confined to the nodes 12, not to the network 10 itself. This WDM network 10 can be characterized as transparent in the sense that an uninterrupted optical path exists between the transmitting and receiving nodes.

To preserve non-blocking transmission capability between nodes, the number W of WDM wavelengths needs to increase with the number of nodes 12. However, this number W seems to be limited to a relatively small number because of the need to optically amplify the optical signals (the favored erbium-doped fiber amplifier has a limited flat-gain band) and because of the limited bandwidth of many of the preferred wavelength-selective cross-connects. Systems are being demonstrated with W equal to four. This number is planned to be increased to sixteen or twenty. The all-optical network as described, however, is inadequate for interlinking a substantially larger number of nodes. Since the required number of wavelengths grows with the number of nodes, such an architecture is not scalable to a significantly larger network size.

As recognized by Brackett et al. ibid. and by Bala et al. in "The case for opaque multiwavelength optical networks," 1995 *Digest of the LEOS Summer Topical Meetings*, Keystone, Colo., Aug. 7–11, 1995, pp. 58, 59, the number of interlinked nodes can be increased by wavelength reuse and wavelength conversion. The network of FIG. 1 shows reuse of the wavelength $\lambda_1$ in that the same wavelength is used between nodes AS and B and between nodes C and D. Wavelength reuse within a single network 10 can be extended if a node 12 can receive a data signal from another node at one wavelength and transmit that same data signal to yet another node at a second wavelength. This process is generally referred to as wavelength interchange or conversion. However, a more straightforward application of wavelength conversion occurs at the cross connect between two WDM networks.

As illustrated in the network diagram of FIG. 2, two all-optical networks $10_1$, $10_2$ are connected by a wavelength-interchanging cross connect (WIXC) 20. Only two networks are shown, but the concept scales to a large number of networks interconnecting a nearly arbitrarily large number of nodes 12. It is assumed that enough WDM wavelengths are available within each all-optical network $10_1$, $10_2$ to provide the wavelength-identified links between the nodes 12, including the wavelength-interchanging cross-connect 20, so that wavelength-selective switching suffices within each network $10_1$, $10_2$. On the other hand, it is likely that the number of WDM wavelengths is insufficient to provide the required number of such wavelength-identified links between the nodes 12 of both networks $10_1$, $10_2$.

The wavelength-interchanging cross-connect 20 alleviates this problem of insufficient number of WDM wavelengths with its capability of receiving a WDM signal from the first network $10_1$ at a first wavelength $\lambda_1$ and retransmitting it onto the second network $10_2$ at another wavelength $\lambda_j$.

The network in FIG. 1 can be characterized as implementing the architecture of a mesh network having a relatively large number of switching nodes 16 (more than the two illustrated) within the all-optical network 10 and being intra-connected within the network 10 by an irregular mesh of fibers. Each WSXC 16 may directly connect to multiple nodes 12 and to a number of other WSXCs 16 depending upon the network connectivity.

Another type of network architecture for fiber-based networks is a ring architecture which provides a high degree of survivability in the event of a break in the fiber or a failure of a switching node. In a ring network, the WSXC 16 is characterized as an add/drop multiplexer (ADM) associated with one node 12, and it is further connected to two neighboring ADMs on the ring.

An inter-connected two-ring network is illustrated in the network diagram of FIG. 3. Each of two rings $22_1$, $22_2$ includes a pair of counter rotating fibers 24, 26, and nodes 28 are serially arranged around the rings $22_1$, $22_2$ and connected to both the fibers 24, 26. A wavelength-interchanging cross-connect 29 is connected to all the fibers 24, 26 of both rings $22_1$, $22_2$ and serves to interconnect the rings with the additional capability of wavelength conversion as required. In the context of present-day telephony, the nodes 28 as well as the WIXC 29 are likely to be telephone central offices having additional input and output lines connecting the central offices to the local network. At least at the present time, switching between the rings and the local network will involve the central office converting the optical signal to an electrical signal and subsequently electrically switching the local traffic. A principal advantage of the ring architecture is that if the paired fibers 24, 26 are broken at one spot, for instance, in a construction accident, the signals on the ring can be rerouted to the fiber rotating in the other direction so as to maintain fall connectivity. Even if one node 28 fails, traffic can be rerouted so as to avoid that node, thus providing full connectivity between the remaining nodes.

It should be apparent that the WIXC 29 for the ring architecture provides much the same functions as the WIXC 20 for the mesh architecture. The ring architecture also emphasizes that the ring nodes 28 are operating as add-drop multiplexers (ADMs). In so far as the switching nodes 16 of the mesh architecture are located at central offices, they too can be explained in terms of ADMs.

An add/drop multiplexer (ADM) is a fundamental element in most communication networks using multiplexing on a single physical channel. The ADM is connected to a transmission path and is capable of extracting (dropping) one of the multiplexed signals from the path and further capable of inserting (adding) a signal to the optical path in place of the dropped signal. In some sense, the remaining multiplexed signals are not affected by the add/drop operation. For optical wavelength-vision multiplexed system, several fundamental multi-wavelength add/drop multiplexers (WADMs) are available which can switch one or more selected wavelengths into and out of an optical path without an opto-electronic conversion. Such WADMs may be implemented by the acousto-optical filter described by Cheung et al. in U.S. Pat. No. 5,002,349, the liquid-crystal optical switch described by Patel et al. in U.S. Pat. Nos. 5,414,540 and 5,414,541, or the mechanically selected optical switch commercially available from JDS Fitel and described by Iqbal et al. in "High performance optical switches for multiwavelength rearrangeable optical networks," *Government Microelectronic Circuits Application Conference (GOMAC)* '94, San Diego, Calif., November 1994, 3 pp. Any of these switches when inserted in the WDM optical path can extract any selected combination of the WDM signals on the path. These afore described WADMs are all optical switches in the sense that they involve no conversion from the optical to the electronic domain in performing the switching. They are referred to as transparent because an optical signal incident upon the such a switching circuit is transmitted in the same form on the output of the switching circuit regardless of the format of the signal. These optical switches of Cheung et al. and Patel et al., however, are still considered immature technologies or not suited for commercial use.

Yoo has suggested an elegant component for the wavelength-interchanging cross-connect in U.S. Patent 5,434,700. Bhat et al. describe improvements to the device in U.S. patent application Ser. No. 08/602,391, filed Feb. 16, 1996, which has issued as U.S. Pat. No. 5,802,232 and has been published as PCT document be WO-97/29,999 on Aug. 21, 1997. Antoniades et al. describe other improvements directed to the network implementation in U.S. patent application Ser. No. 08/568,037, filed Dec. 6, 1995, which has issued as U.S. Pat. No. 5,825,517 and has been published as PCT document WO-97/21,289 on Jun. 12, 1997. The Yoo device is an all-optical wavelength converter based upon non-linear optical interactions in a quasi-phase matching semiconductor waveguide.

Yoo's wavelength converter, and the network implementations of Antoniades et al. are advantageous because there is no need to convert the optical signals to the electrical domain to achieve the wavelength conversion. In a sense, their WIXC extends the transparency of transmission across multiple networks because no opto-electronic conversions are required in the multiple network transmission, thus eliminating any format dependency in the conversion, but changes in wavelengths are permitted. Opto-electronic conversions are disadvantageous in a network because they depend upon bit-rate and format.

However, Yoo's wavelength converter and its network implementation also represent relatively new and complex technology. It is desired to rely on more conventional technology for major parts of the existing telephone network which will be only incrementally and incompletely changed to WDM.

Furthermore, a cross-connect between two WDM networks will likely be placed at a pre-existing major central office or switching hub, either of which has a large number of conventional electronic or optical SONET links that need to be switched into or out of the WDM networks. Furthermore, supervisory and maintenance signals need to dropped or added at the cross-connect. A high-speed digital cross-connect switch (SCS), which typically provides such switching and drop/adding, can be connected to an all-optical WIXC as an immediately adjacent node, but at the cost of repetitive switching.

SUMMARY OF THE INVENTION

A hybrid wavelength-interchanging cross-connect for a multi-wavelength communication system including both optical and electrical switching elements, the electrical switching element including opto-electronic receivers and transmitters for the different wavelengths, whereby it can perform wavelength conversion upon the signals passing through it.

In one aspect of the invention, the incoming multi-wavelength signal received on an input port is optically demultiplexed into its constituent signals. Some of them are sent on transparent paths to an output port while others are sent on opaque paths to an electronic switching circuit, wherein they can be both switched and wavelength translated.

In another aspect of the invention, single-wavelength optical switches are arranged between single-wavelength paths either in parallel to electronic switching circuitry or on the input or output side of the electronic circuitry.

In a further aspect of the invention, multiple-wavelength optical switches are arranged to switch signals either to electronic switching circuitry or to bypass it. Further, bypassing may be accomplished by an optical demultiplexer connected between the multiple-wavelength switch and the electronic switching circuitry, some of its outputs entering the switching circuitry and others bypassing it.

In another aspect of the invention, four multi-wavelength fibers enter the interconnect. Multi-wavelength optical switches enable transparent optical switching to any of four output fibers while electronic switching circuitry capable of receiving some but not all of the input signals provide limited wavelength translation.

In yet another aspect of the invention, opto-electronic switching circuitry may be composed of multiple interconnected opto-electronic switching circuits of lower complexity.

DETAILED DESCRIPTION OF THE PREFERRED EMBODIMENTS

Figure 4:
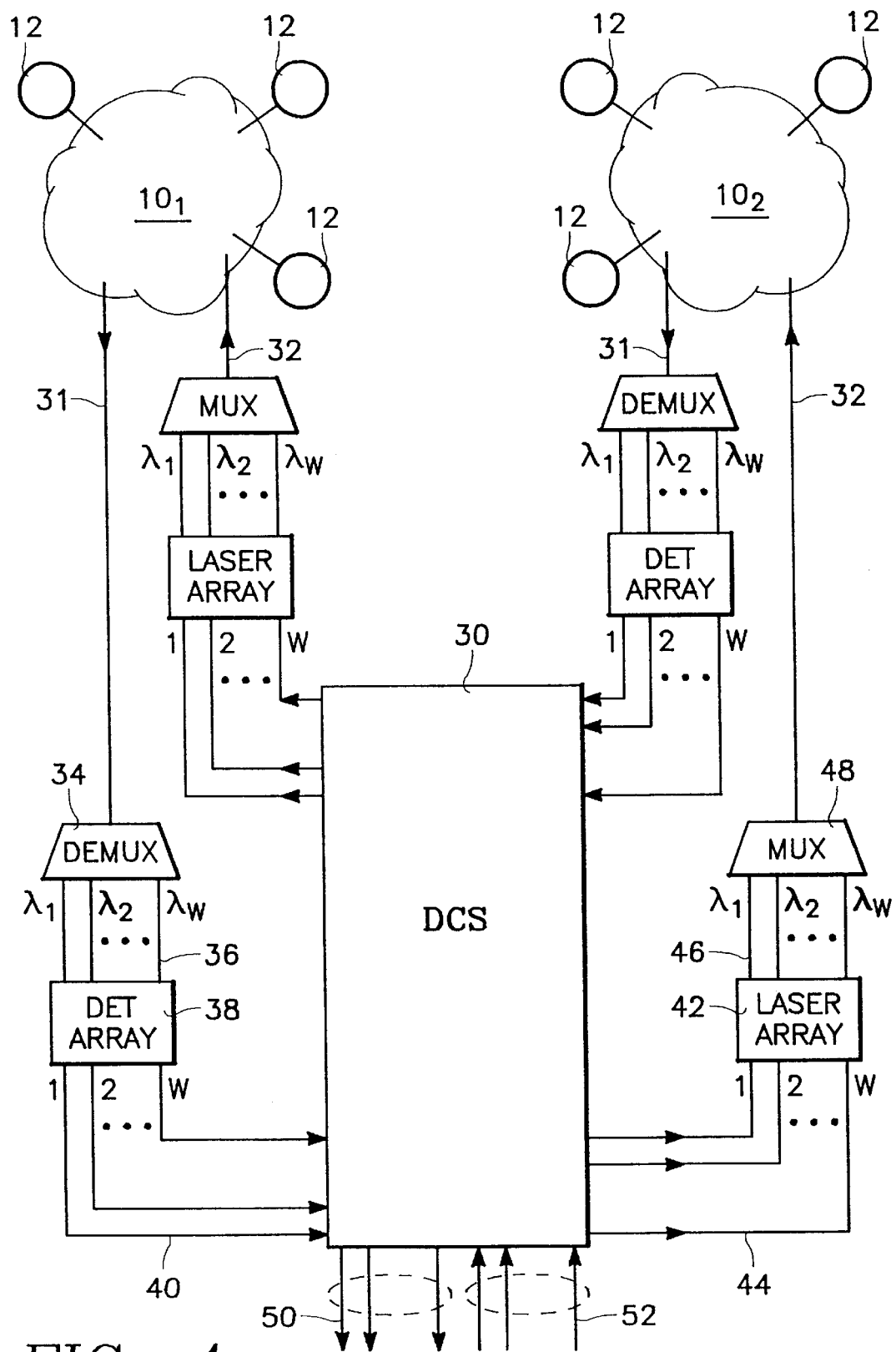
FIG. 4 is a combined network and circuit diagram of a digital cross-connect between two WDM networks.

Two or more WDM networks $10_1$, $10_2$ can be interlinked through a wavelength-interchanging cross-connect 20, as illustrated in the network diagram of FIG. 4, using principally a digital cross-connect switch 30. The illustrated switching system is connected to the two all-optical networks $190_1$, $10_2$ by respective drop fibers 31 and add fibers 32. An optical demultiplexer 34 demultiplexes the W-fold WDM signal on the respective drop fiber 31 into single wavelength signals on W parallel optical paths 36. A detector array 38 having W detectors detects the optical signals on the separate optical paths 36 and converts them to electrical signals on W parallel electrical lines 40, which the digital cross-connect receives as electrical inputs. Similarly, for each network $10_1$, $10_2$, a laser array 42 has its W lasers modulated according to electrical signals on W electrical lines 44, which are the electrical outputs of the digital cross-connect 30. The laser array 42 outputs W optical signals on W optical paths 46. An optical multiplexer 48 multiplexes the W optical signals into a W-fold WDM signal on the add fiber 32 to the respective all-optical network $10_1$, $10_2$. The DCS 30 additionally interfaces to a number of electrical drop lines 50 and electrical add lines 52. The figure has been simplified and does not include the typical drivers, interfaces, control systems, etc.

The DCS 30 can perform a number of functions. Although not illustrated as such, the DCS 30 is a digital not an analog switch. The DCS 30, in conjunction with the multiplexer 48, demultiplexer 34, and laser and detector arrays 42, 38, can switch optical signals between the two all-optical networks $10_1$, $10_2$. Not only can this switching be done while preserving the wavelength of the optical signal despite the intermediate opto-electronic conversions, but this switching can also effect wavelength conversion between the two networks $10_1$, $10_2$ since a data signal detected at one optical carrier wavelength may modulate a laser emitting at a different wavelength. The DCS 30 can additionally switch electrical signals from the switch electrical inputs 40 to the electrical drop lines 50 and from the electrical add lines 52 to the switch electrical outputs 44. Thereby, the DCS 30 can operate as an access node to both networks $10_1$, $10_2$. It should be further appreciated that a DCS 30 of sufficient size and generality can also operate as a wavelength converter for a single network $10_1$ or $10_2$ if it switches a signal received from that network back to the same network, the optical wavelength being changed during the process.

Figure 1:
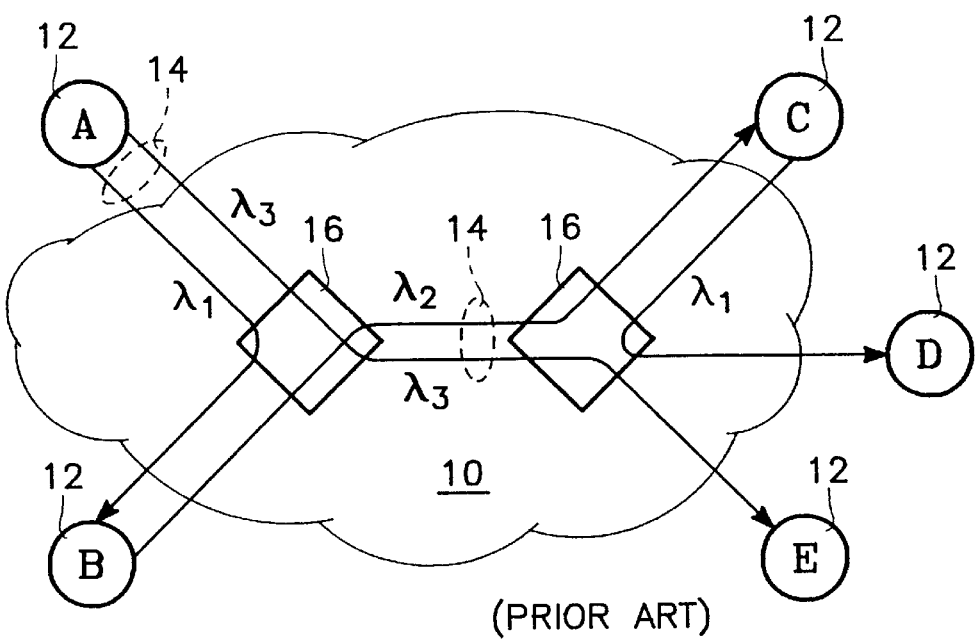
FIG. 1 is a network diagram of an wavelength-division multiplexed (WDM) all-optical communication network.
Figure 2:
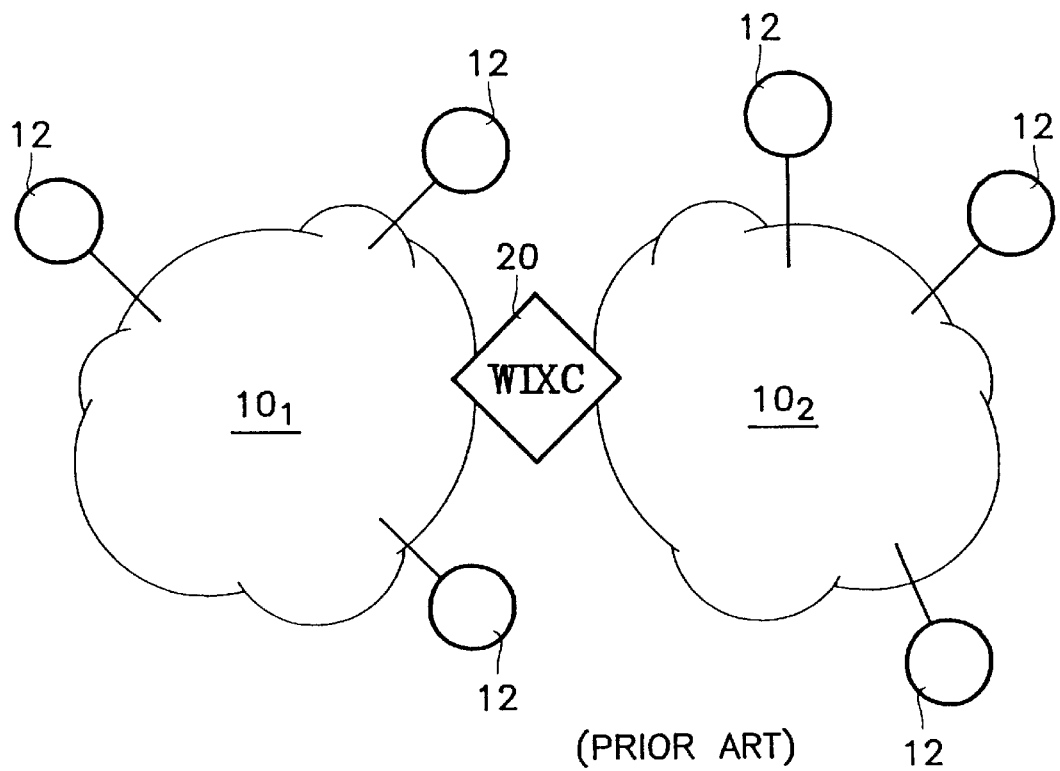
FIG. 2 is a network diagram of two interconnected WDM networks.
Figure 3:
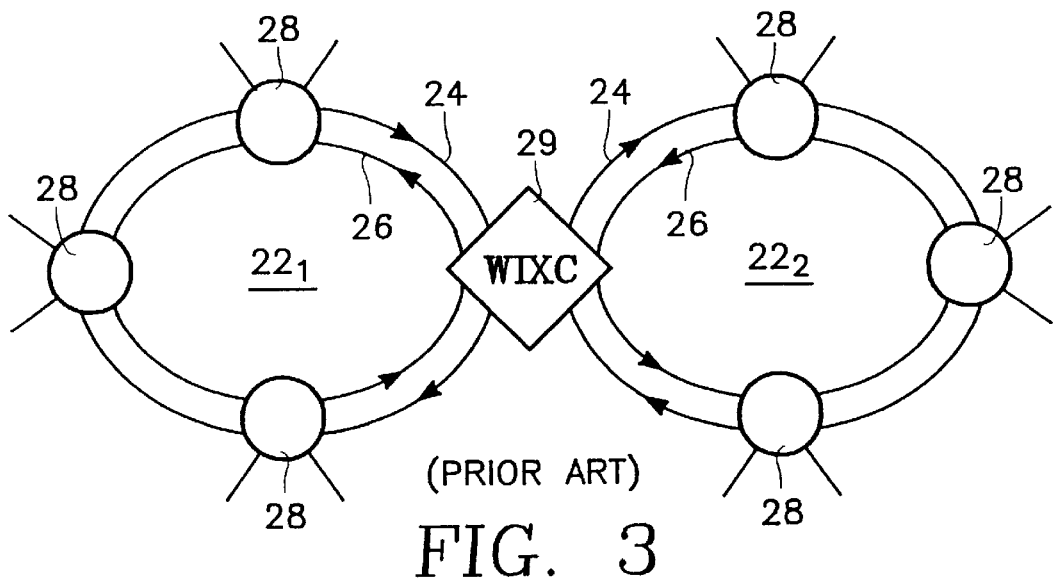
FIG. 3 is a network diagram of two interconnected WDM rings.

The switching system of FIG. 4 provides the functionality required of the wavelength-interchanging cross-connect 20 of FIG. 2. However, it is opaque in the sense that no optical path extends through the DCS 30 and associated detector and laser arrays 38, 42. The opacity between networks has the advantage that it circumvents physical layer constraints exhibited by extending the all-optical network, including transparent wavelength conversion, through too many stages of amplification and wavelength conversion. That is, the DCS 30 acts as a regenerator, with both the advantages of maintaining signal form and the disadvantages of the attendant complexity and cost. As stated by Bala et al. ibid., this increases the scalability of the network. The opacity has the usual disadvantage that the DCS 30 strongly depends upon the bit rate and format of the signal and any changes require major changes to the DCS.

Figure 5:
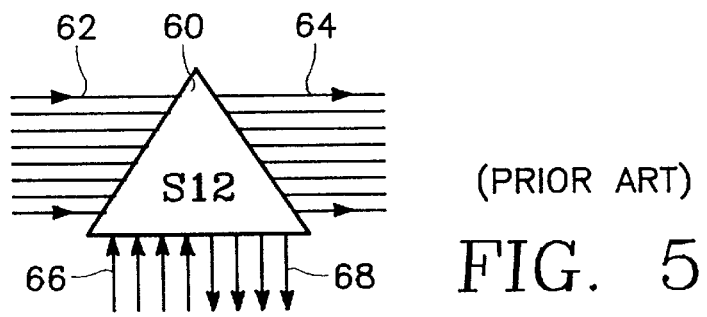
FIG. 5 is a schematic representation of an opto-electronic switching module.

The switching system, including the DCS 30, of FIG. 4 has been reduced, as illustrated in FIG. 5, to two switching modules for the case of 8 WDM wavelengths, that is, W=8. A 12-fold switching module 60 includes eight fiber inputs 62, eight fiber outputs 64, four electrical inputs 66, and four electrical outputs 68. Although electrical and fiber lines are illustrated, it is understood that fiber pig-tailing and electrical bonding must be performed on the actual module. Such a 12-fold switch module is the WEST module disclosed by Chang et al. In "40 Gb/s WDM cross-connect with an electronic switching core; preliminary results from the WEST consortium," *Conference Proceedings; LEOS '97 10th Annual Meeting*, IEEE Lasers and Electro-Optical Society 1997 Annual Meeting, Nov. 10–13, 1997, San Francisco, Calif., vol. 2, pp. 336, 337.

Figure 6:
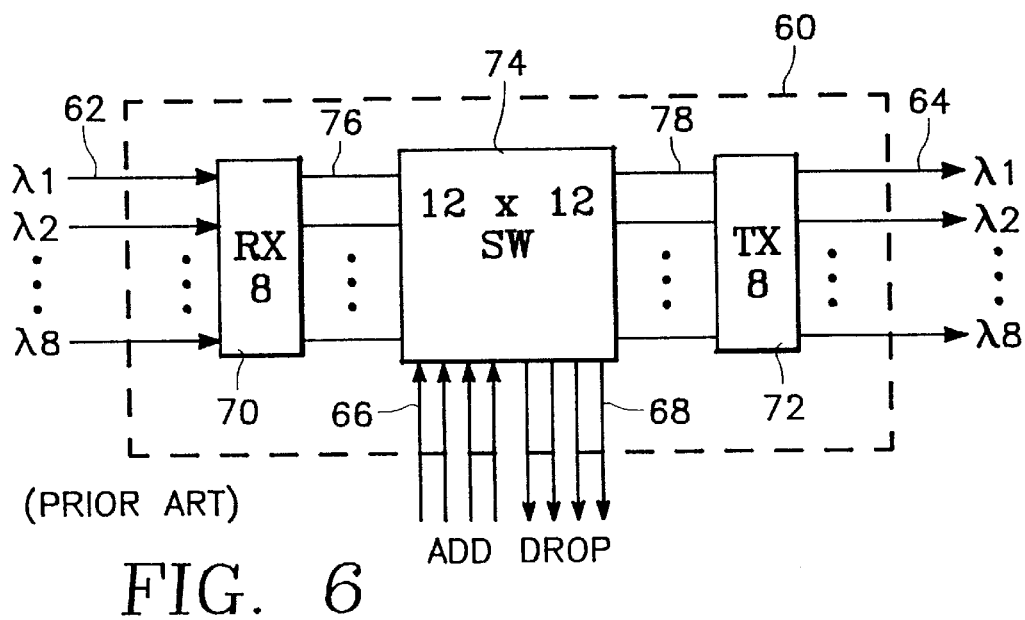
FIG. 6 is a circuit diagram of the switching module of FIG. 5.

The 2-fold switching module 60 includes, as shown in the circuit diagram of FIG. 6, an 8-wavelength receiver array 70 including eight optical detectors, an 8-wavelength transmitter array 72 including eight laser emitting at different wavelengths, and a 12×12 electronic switch 4. The electronic switch 74 has twelve inputs connected to eight electrical lines 76 from the receiver array 70 and to the four electrical add lines 66. It also has twelve outputs connected to eight electrical lines 78 connected to the laser array 72 and to the four electrical drop lines 68. The 12-fold switching module 60 was designed to operate at up to 10 GHz so as to accommodate packet switching and the like. Although the electronic switch 74 may be a 12×12 cross-point switch, the receiver and transmitter arrays 70, 72 provide respectively the clock recovery and reframing typical of a digital cross-connect to provide the functionalities of a digital cross-connect switch 30.

A pair of such switching modules 60 can be applied to the wavelength-interchanging cross-connect 20 of FIG. 4. As illustrated in the network diagram of FIG. 7, two 12-fold switching modules 60 are connected in anti-parallel transmission directions in a doubled 12-fold opto-electronic switching circuitry 80 between the two all-optical networks $10_1$, $10_2$. Each switching module 60 receives eight optical signals of different wavelengths from the associated optical demultiplexer 34 and transmits eight optical signals of different wavelengths to the associated optical multiplexer 48. Each switching module 60 also receives four electrical add lines 66 and transmits to four electrical drop lines 68. The combination of the doubled 12-fold opto-electronic switching circuitry 80, the two optical demultiplexers 34, and the two optical multiplexers 48 form an optical wavelength-interchanging cross-connect 82. The fibers 30, 32 form transport interfaces while the additional drop lines 66, 68 typically form client interfaces. Although this architecture suffers some limitations over the generalized DCS 30 of FIG. 4, the level of complexity is significantly reduced.

Figure 7:
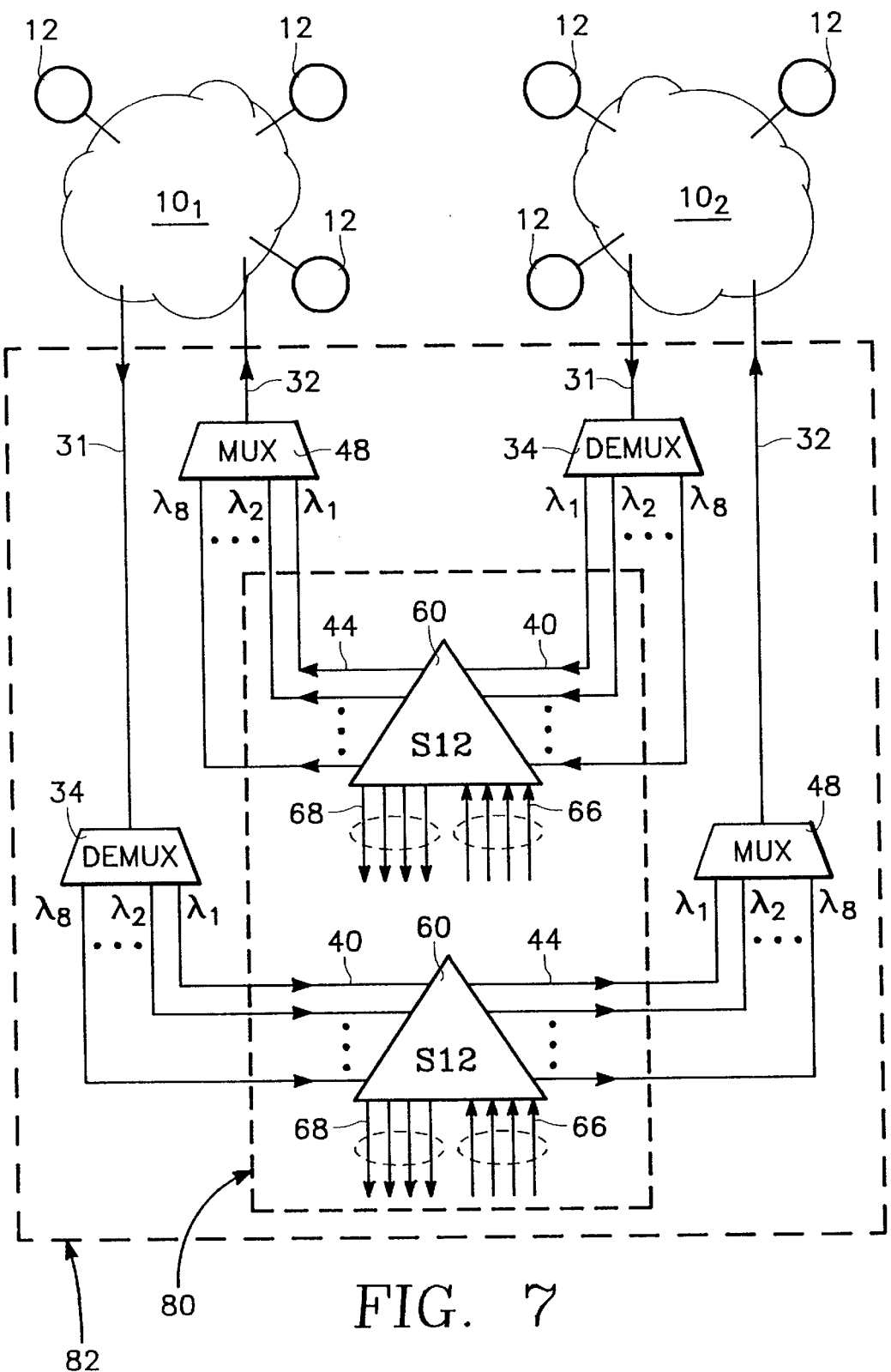
FIG. 7 is a network diagram of the switching modules of FIGS. 5 and 6 being used as the cross-connect for the two WDM networks of FIG. 2.

The architecture of FIG. 7 provides arbitrary wavelength interchanging between the networks $10_1$, $10_2$ within the constraints of color clashing, that is, as long as no two optical signals on any network fiber are assigned the same wavelength. However, the switching modules 60 are fundamentally based upon the functionality of digital cross-connects. Thus, the modules 60 recover the clock signal and regenerate the optical and electrical data signals at the cost of being sensitive to format and bit-rate. The opaqueness is acceptable in some situations, but some customers prefer a totally transparent path through the network in order that they can control and modify their signal format and speed without regard to the network or its other customers.

Figure 8:
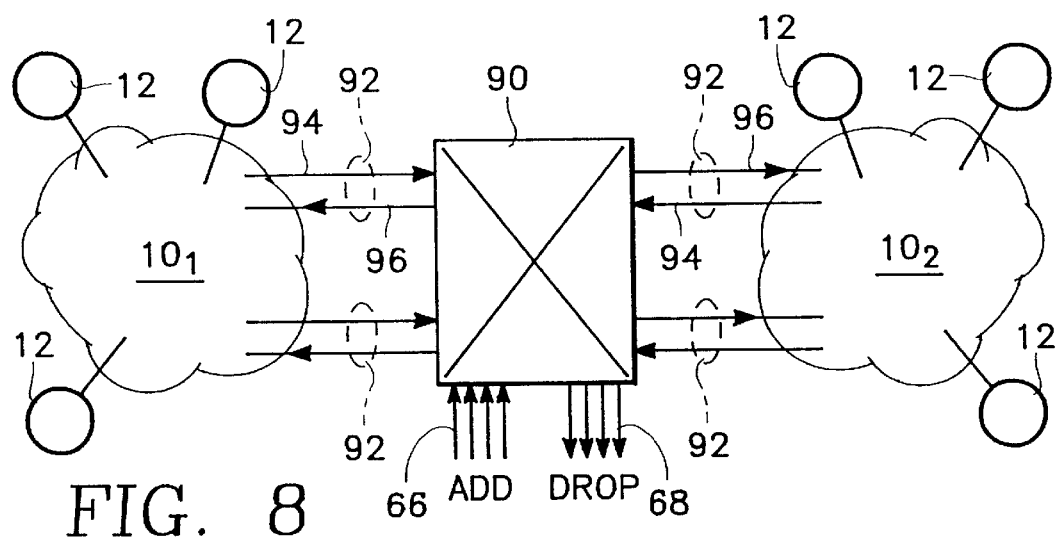
FIG. 8 is a network diagram of another embodiment of a cross-connect between two WDM networks.

A more complex inter-network cross-connect 90 is illustrated in the network diagram of FIG. 8 interconnecting the two WDM networks $10_1$, $10_2$. Each network $10_1$, $10_2$ is connected to the cross-connect 90 by two pairs 92 of optical fibers, one of each pair 92 being a input fiber 94 with respect to the cross-connect and the other being an output fiber 96. The pairing of the fibers 94, 96 reflects the fact that fiber is almost always designed to carry optical signals in a single direction. The two pairs 92 on each side are consistent with either the inter-network cross-connect 90 being at a major hub or with the likelihood of each of the WDM networks $10_1$, $10_2$ being based upon a double-ring architecture. As before, the inter-network cross-connect 90 also includes several electrical add lines 66 and electrical drop lines 68, for example, four of each. The fibers 92, 94 can be considered as transport interfaces while the add/drop lines 66, 68 can be considered as client interfaces.

As illustrated, the inter-network cross-connect 90 has both optical connections 92, 94 and electrical connections 66, 68.

If the cross-connect 90 is based upon a digital cross-connect, then the WDM signals on the optical receiving side need to be optically demultiplexed, converted to electrical form, and switched. On the optical transmitting side, the signals after switching need to be converted to optical form and optically multiplexed onto the fibers. Clock recovery and refraining are assumed. With this type of regeneration, the DCS-based cross-connect 90 can provide wavelength translation for the optical signals.

Figure 9:
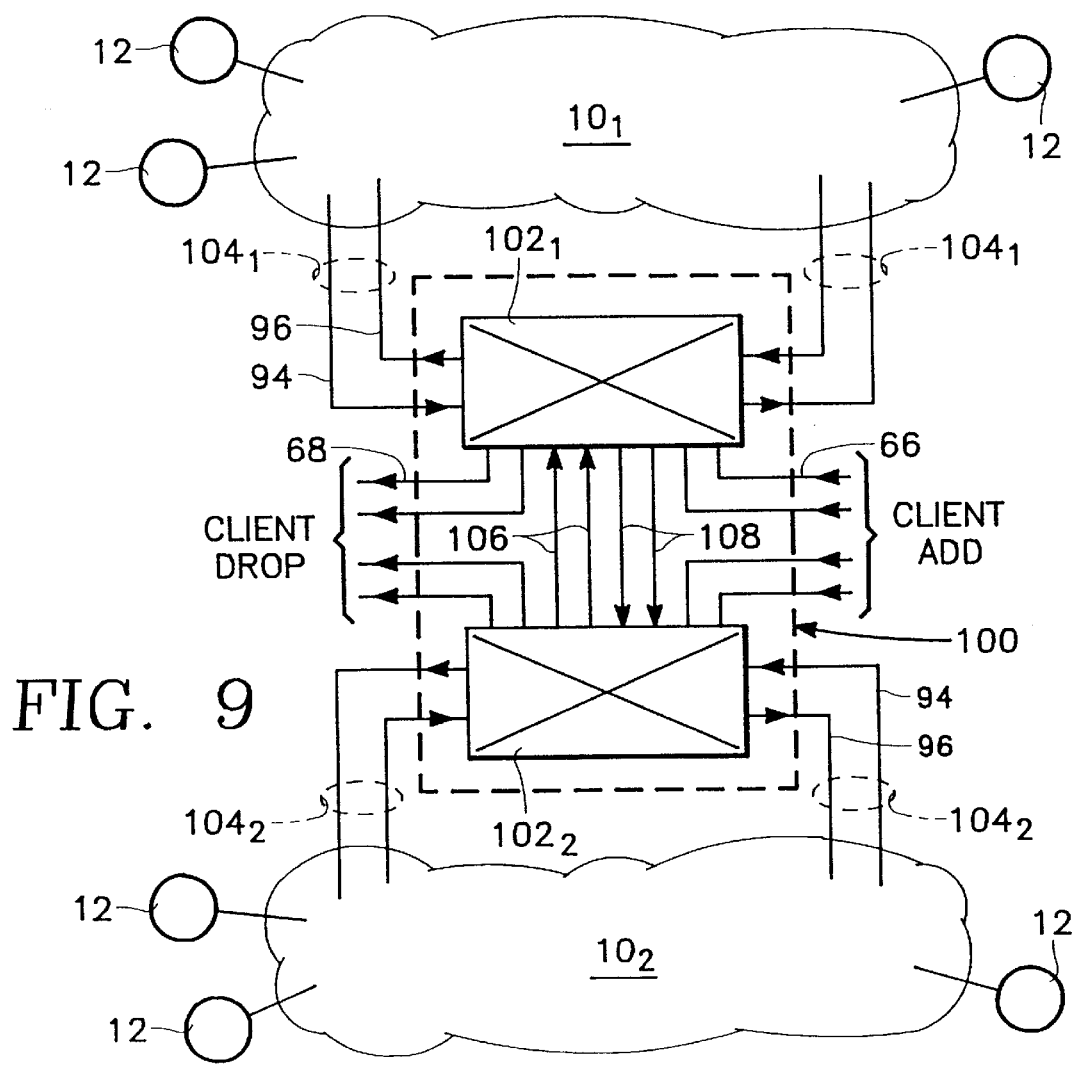
FIG. 9 is a network diagram of a simplified version of the cross-connect of FIG. 8.
Figure 12:
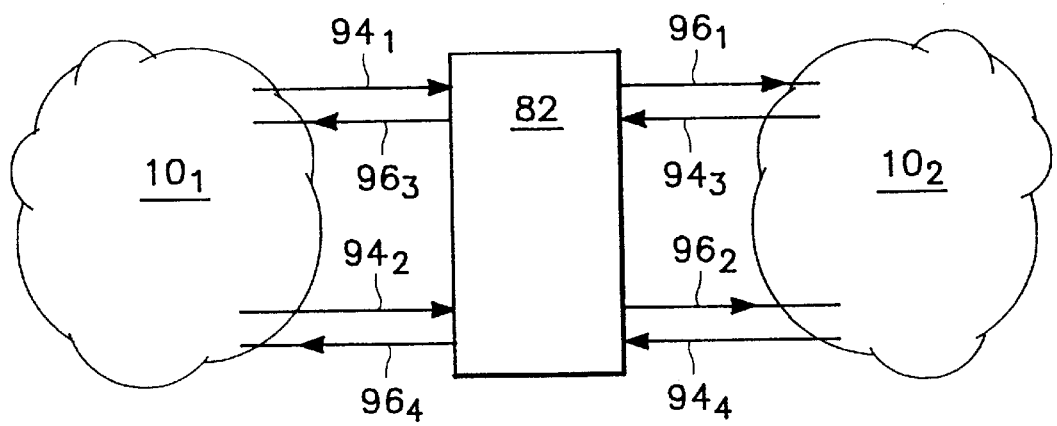
FIGS. 12 and 13 are two circuit diagrams for alternative connections of the wavelength-interchanging cross-connect of FIG. 11.
Figure 13:
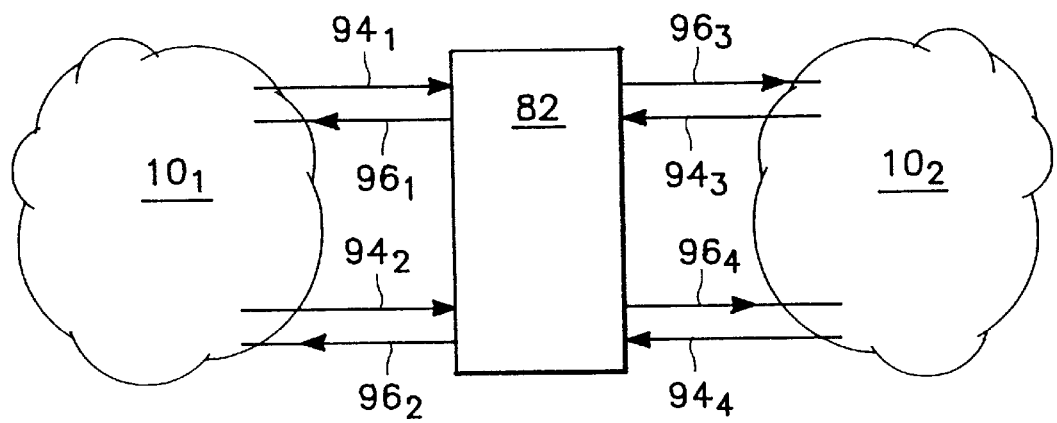

The complexity of the cross-connect 90 can be reduced by considering its placement within the respective network. A simplified cross-connect 100, illustrated in FIG. 9, includes two switching modules $102_1$, $102_2$ most closely associated with a respective one of the WDM networks $10_1$, $10_2$. (However, as will become apparent from FIGS. 12 and 13, it is also possible that they be symmetrically associated with the two networks $10_1$, $10_2$.) Two respective pairs $104_1$, $104_2$ of bidirectional fibers 94, 96 are connected between each switching module $102_1$, $102_2$ and the associated WDM network $10_1$, $10_2$. Two electrical add ports and two electrical drop ports on each switching modules $102_1$, $102_2$ are cross connected in a complementary fashion between the modules $102_1$, $102_2$ through anti-parallel electrical cross links. Two other electrical add ports and two electrical drop ports on each of the modules $102_1$, $102_2$ are connected to the electrical add lines 66 and drop lines 68.

This inter-network cross-connect 100 provides four client add lines 66, four client drop lines 68, and two anti-parallel pairs 106, 108 of electrical cross links between the modules $102_1$, $102_2$ to interconnect the transport interfaces between the two networks $10_1$, $10_2$. Significantly, the interconnection between the two networks $10_1$, $10_2$ is performed over electrical lines. Thus, the inter-network cross-connect 100 can perform wavelength conversion.

To this point, the nature of the switching modules $102_1$, $102_2$ has not been described. Each could be implemented as a DCS. However, the size of each such DCS would be large. Assuming 8-wavelength WDM, each fiber 94, 96 carries 8 signals which must be demulitplexed prior to switching. Additionally, there are two add lines 66, four drop lines 68, and four anti-parallel lines 106, 108 for each module. As a result, the switching fabric of each switching module $102_1$, $102_2$ should include a 20×20 cross-point or equivalent switch. This is a very large switch. Also, the resulting DCS switching system is totally opaque and does not provide any transparent path through the DCS.

Figure 10:
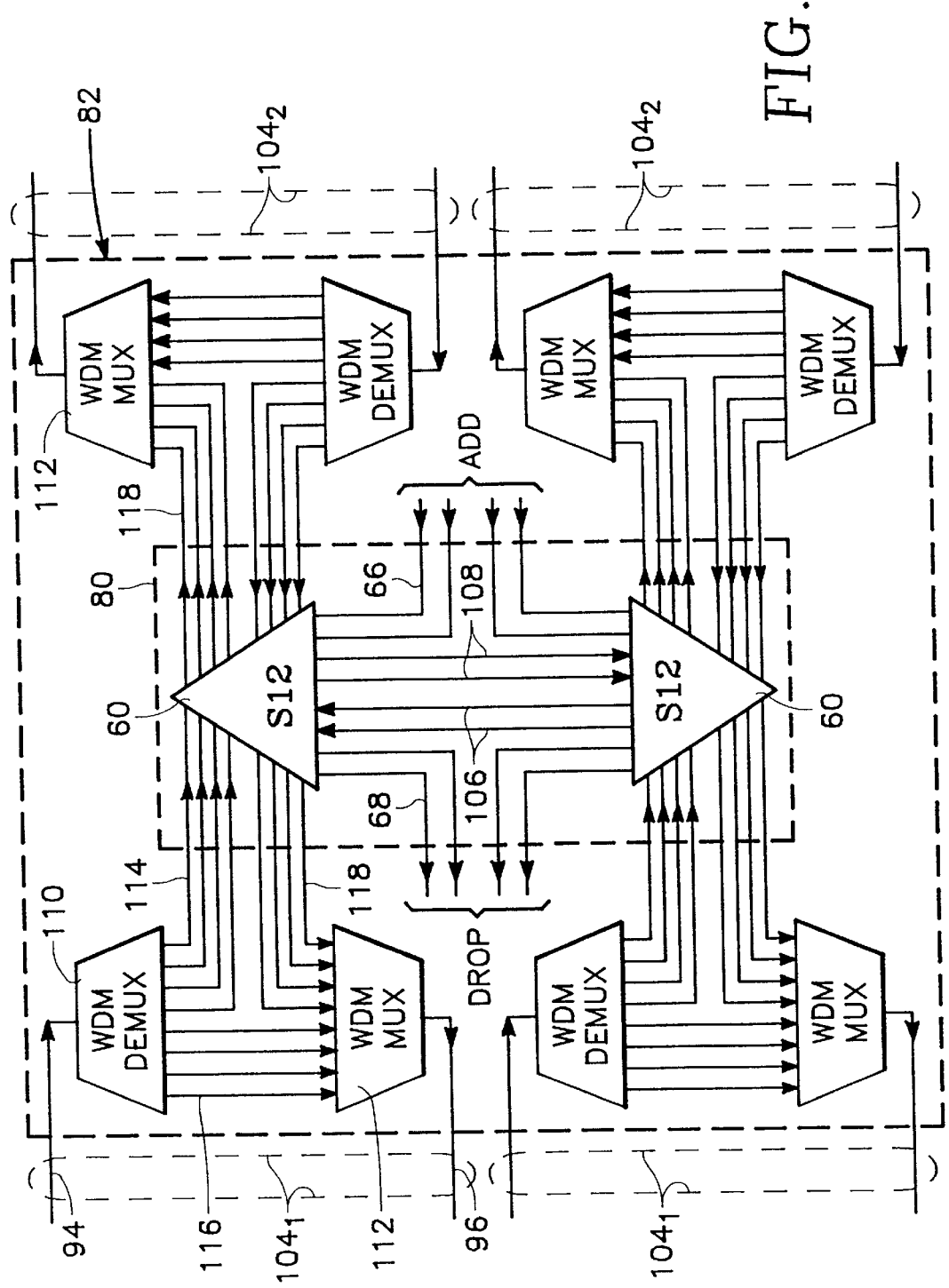
FIG. 10 is a circuit diagram of an embodiment of the network of FIG. 8.

According to one aspect of the invention, a hybrid wavelength-interchanging cross-connect (WIXC) is accomplished by a combination of optical switching of optical signals and space switching of electrical signals. In one such embodiment, as illustrated in FIG. 10, the wavelength-interchanging cross connect 82 is achieved with the combination of optical and opto-electronic elements. Each input fiber 94 from the respective optical network $10_1$, $10_2$ is connected to an optical demultiplexer 110 while the corresponding output fiber 96 is connected to an optical multiplexer 112. The optical demultiplexer 110 has W optical outputs, here illustrated as W=8, corresponding to the separate WDM signals while the multiplexer 112 has W optical inputs. The W multiplexer optical outputs are connected to two types of optical paths 114, 116 while the W demultiplexer optical inputs are similarly connected to optical paths 116, 118. The optical paths 116 are immediately connected between the demultiplexer 110 and the multiplexer 112 that are associated with the same pair $104_1$, $104_2$ of bidirectional fibers 94, 96. On the other hand, the remaining optical paths 114, 118 are connected to a 12-fold switching module 60, such as the one illustrated previously in FIGS. 5 and 6.

The 12-fold switching module 60 thus receives one type of optical paths 114 from the optical demultiplexer 110 and transmits to one type of optical paths 118 to the optical multiplexer 112. Each 12-fold switching module 120 is associated with two pairs of demultiplexers 110 and multiplexers 112 and is connected to those optical paths 114, 118 associated with both pairs. The 12-fold switching module, at least of the type previously described, has optical receivers and transmitters connected to the optical paths 114, 118 to interface with an electronic 12×12 switching fabric.

Assume that each fiber 94, 96 carries 8 WDM signals and that the first four wavelengths $\lambda_1$, $\lambda_2$, $\lambda_3$, $\lambda_4$ are electronically switched through the twelve-fold switching modules 60 while the last four wavelengths $\lambda_5$, $\lambda_6$, $\lambda_7$, $\lambda_8$ remain in the optical domain. This combination of electronic and optical switching is referred to as hybrid switching.

In the configuration illustrated in FIG. 10, the first four wavelengths $\lambda_1$, $\lambda_2$, $\lambda_3$, $\lambda_4$ on any input fiber 94 can be both switched to any output fiber 96 and can also be wavelength converted to any of the first four wavelengths $\lambda_1$, $\lambda_2$, $\lambda_3$, $\lambda_4$ on that output fiber 96. If the input and output fibers 94, 96 are paired as illustrated in pairs $104_1$, $104_2$ as a fiber path passing through a node, for example, in a double ring network, the illustrated configuration can perform wavelength conversion among the first four wavelengths $\lambda_1$, $\lambda_2$, $\lambda_3$, $\lambda_4$ on that fiber path.

The illustrated configuration breaks the opto-electronic switching circuitry 80 into two 12-fold switching modules and reduces the digital cross-point from a 20×20 switching array to two 12×12 arrays. However, the configuration suffers from the limitations that the second four wavelengths $\lambda_5$, $\lambda_6$, $\lambda_7$, $\lambda_8$ not only cannot be wavelength converted but further cannot be switched out of the fiber path. For add/drop modules in conventionally designed nodes and network cross-connects, the lack of optical switching may be acceptable, but the lack significantly limits the use of wavelength-directed routing that is greatly desired in WDM networks. Also, with conventional multiplexers and demultiplexers, this configuration has a fixed wavelength allocation of opaque and transparent channels.

Figure 11:
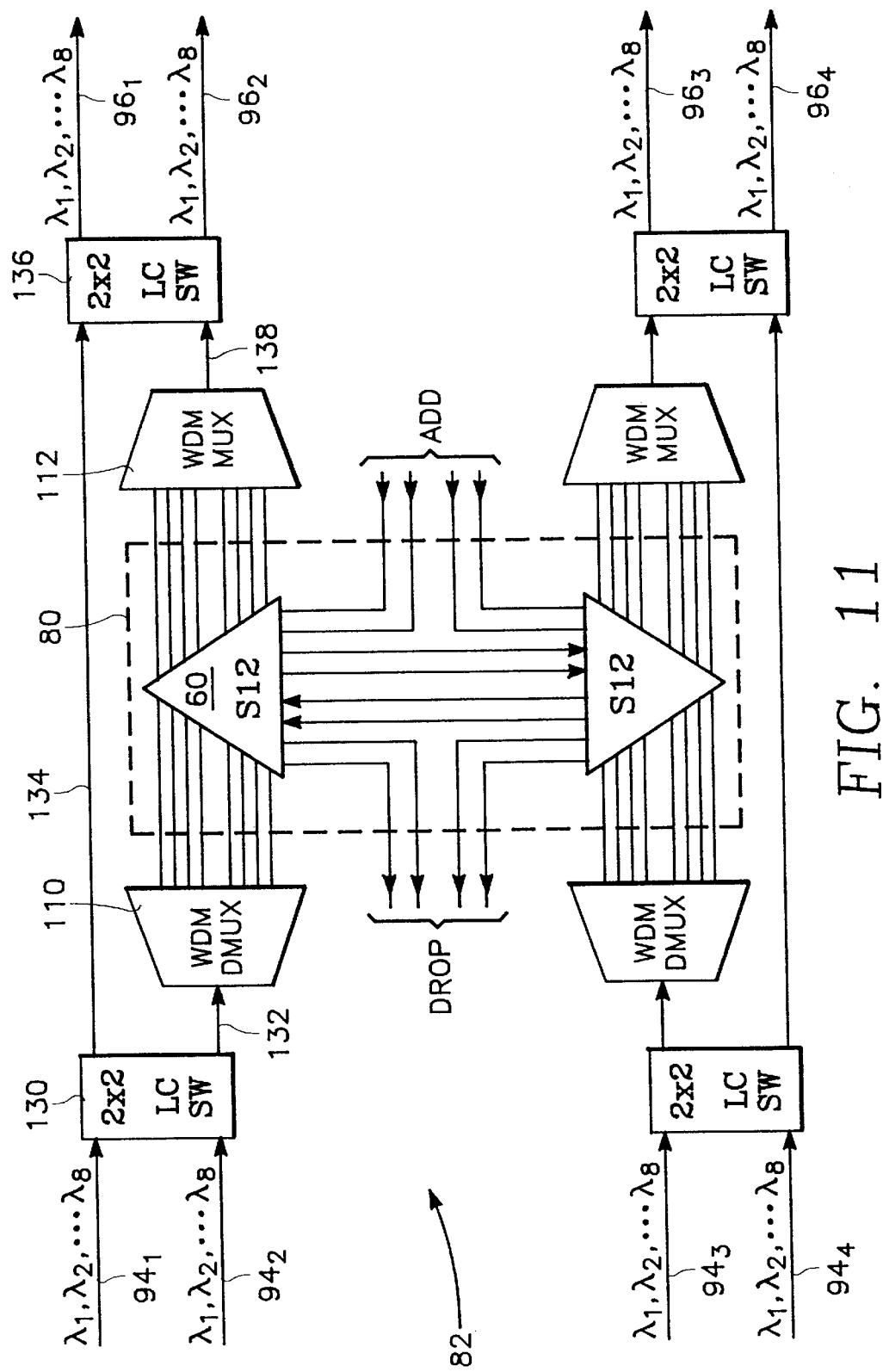
FIG. 11 is a circuit diagram of a variant to the embodiment of FIG. 10 which provides transparent channels through the wavelength-interchanging cross-connect.

The transparent optical switching is significantly enhanced in the embodiment for the inter-network wavelength-interchanging cross-connect 82 illustrated in the network diagram of FIG. 11. Two pairs of input fibers $94_1$, $94_2$, $94_3$, $94_4$, each assumed to be carrying eight WDM wavelengths, are pairwise connected to input ports of respective multi-wavelength 2×2 optical switches 130. These optical input switches 130, for example, the liquid-crystal switches of Patel and Silberberg, are capable of independently switching the eight wavelengths $\lambda_1$, $\lambda_2$, $\lambda_3$, $\lambda_4$, $\lambda_5$, $\lambda_6$, $\lambda_7$, $\lambda_8$ from its two input ports to its two output ports. One output port is connected to a switching optical path 132 that inputs to the WDM multiplexer 110, that is, enters electronic switching circuitry resembling that of FIG. 10. The other output port is connected to a bypass optical path 134 that bypasses the electronic switching circuitry and inputs to an input port of an output multi-wavelength 2×2 optical switch 136. The other input port of the output optical switch 136 receives a switched optical path 138 from the WDM multiplexer 112 at the output of the electronic switching circuitry.

The electronic switching circuitry includes the previously described pair of 12-fold switching modules 60, associated receivers and transmitters, and the electrical add/drop lines. As previously described, the electronic switching circuitry can perform wavelength conversion.

The outputs of the two output optical switches 136 are connected to two pairs of output fibers $96_1$, $96_2$, $96_3$, $96_4$.

The embodiment of the hybrid WIXC 82 of FIG. 11 offers significantly enhanced switching over the embodiment of FIG. 10, both for wavelength conversion and for transparent optical switching. The input optical switches 130 can switch a signal of any wavelength $\lambda_1$, $\lambda_2$, $\lambda_3$, $_4$, $\lambda_5$, $\lambda_6$, $\lambda_7$, $_8$ on either of the paired input fibers 94 to the digital switching circuitry for electronic switching and wavelength conversion as long as the corresponding wavelength from the other paired input fiber is not also so selected, that is, transparent vs. opaque channels. The electronic circuitry can switch and wavelength convert the selected signals to any output fiber or any wavelength subject to the usual color-clash constraints on the outputs. The input optical switches 130 can also switch any wavelength $\lambda_1$, $\lambda_2$, $\lambda_3$, $\lambda_4$, $\lambda_5$, $\lambda_6$, $\lambda_7$, $\lambda_8$ to bypass the electronic digital switching circuitry, thus providing a transparent pathway and avoiding any formatting constraints of the electronic circuitry. It is not fully non-blocking if transparent and opaque conditions are both required. The output optical switches 136 provide a limited amount of optical switching between the paired output fibers 96. In this embodiment, optical signals input on the top of the circuit can exit on the bottom of the circuit only by passing on an opaque path through the electronic 12-fold switching modules 120.

It is understood that the use of additional optical switches 130, 136 is not limited to the illustrated configuration. For example 1×2 and 2×1 switches could be used with only two input fibers 94 and two output fibers 96.

There are two principal ways of connecting the inter-network cross-connect 82 of FIG. 11 to two networks. As illustrated in the network diagram of FIG. 12, the ports $94_1$, $94_2$, $96_3$, $96_4$ are connected to the first network 10$_1$ while the ports $94_3$, $94_4$, $96_1$, $96_2$ are connected to the second network 10$_2$. This configuration allows a transparent connection between the two networks 10$_1$, 10$_2$ by means of paths 134 directly connecting the two networks. A second principal configuration is illustrated in the network diagram of FIG. 13. The ports $94_1$, $94_2$, $96_1$, $96_2$ are connected to the first network 10$_1$ and the ports $94_3$, $94_4$, $96_3$, $96_4$ are connected to the second network 10$_2$. This configuration allows a transparent path between the inputs and outputs of the same network 10$_1$, 10$_2$. Other combinations are possible, several of which represent different bar and cross states of the switches 130, 136 and details of the switching module 62 as well as the fiber pairing within the network. The different types of interconnections between the inter-network cross connect and the networks apply to the other embodiments of the invention.

Figure 14:
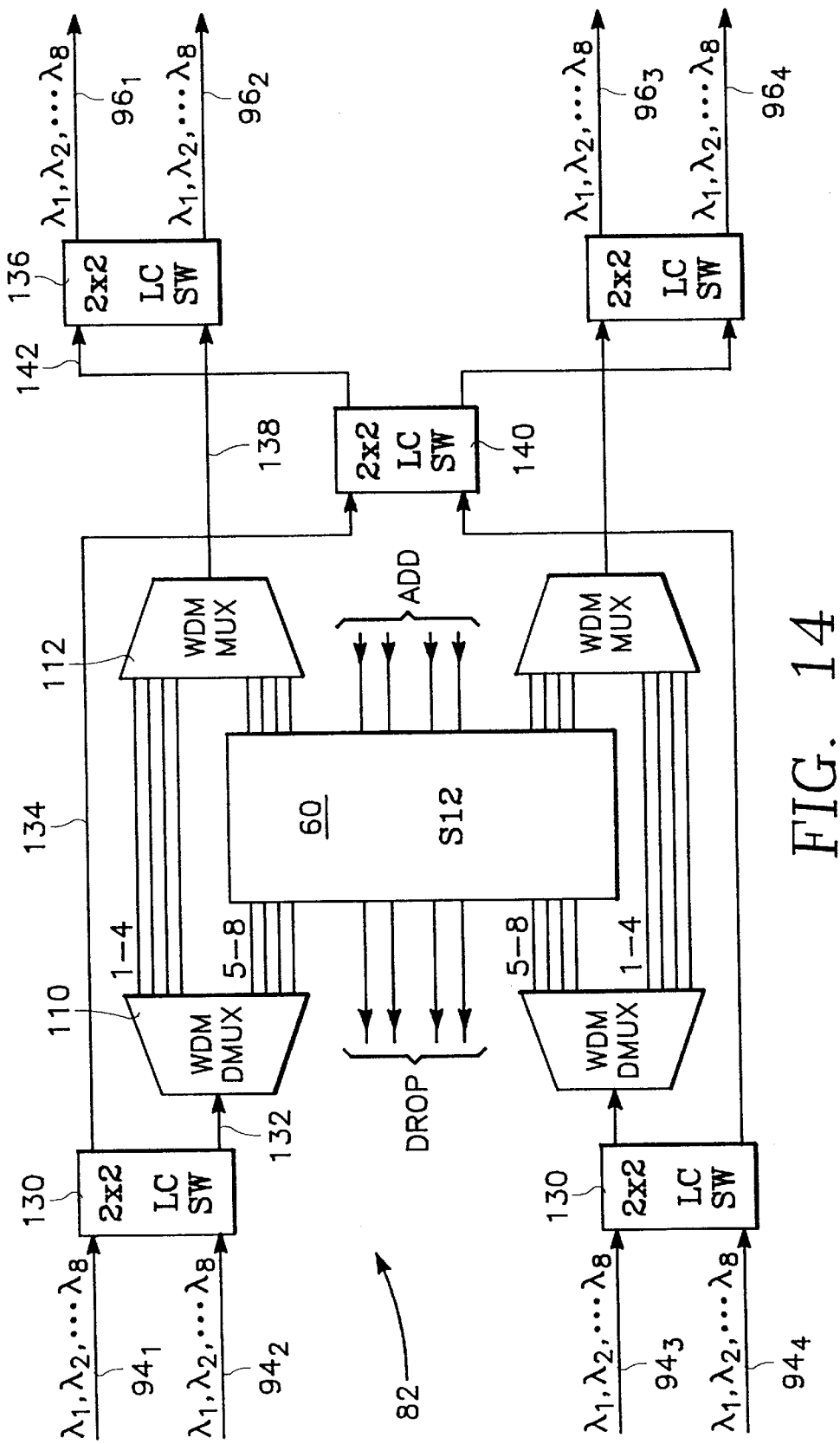
FIG. 14 is a circuit diagram of a yet further variant based upon the embodiment of FIG. 11 providing additional inter-fiber optical switching for transparent channels.

The limitation on all-optical switching on a transparent path between any port pair in FIG. 11 is removed in the switching system of FIG. 14 in which another multi-wavelength 2×2 optical switch 140 bypassing the single 12-fold switching module 60 is used to selectively switch the optical signals on the two bypass optical paths 134 to alternate paths 142 to the two output optical switches 136. Thereby, transparent paths are available, for example, from the input fibers $94_1$, $94_2$ at the upper left to output fibers $96_3$, $96_4$ at both the upper right and lower right. This embodiment decreases the number of 12-fold switching modules 62 but increases the number of optical switches.

At the present time, the most proven optical switch is the 2×2 opto-mechanical switch of JDS Fitel which mechanically moves interconnecting fibers between inputs and outputs of the switch. Such a switch does not select wavelengths for the switching but similarly switches all wavelengths carried on an optical path, and the mechanically actuated switch must be replicated many times for its substitution for a fully selective multi-wavelength switch. At its fundamental level, in a WDM network, the opto-mechanical switch is a single-wavelength switch. Nonetheless, a relatively small but very effective hybrid wavelength-interchanging cross connect can be constructed with such an optical switch. An opto-mechanical switch affords much less capability than a multi-wavelength switch, but it is available and rugged.

Figure 15:
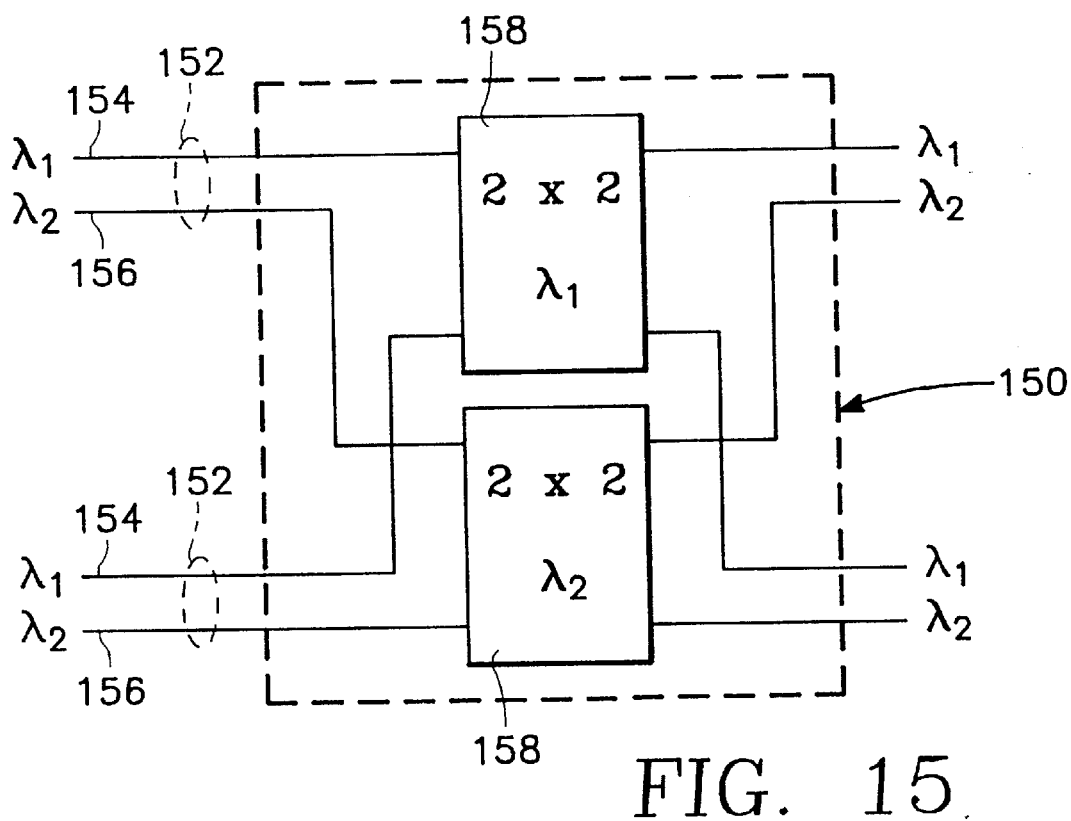
FIG. 15 is a circuit diagram of a two-wavelength basic switch module of several embodiments of the wavelength-interchanging cross-connect of the invention.
Figure 16:
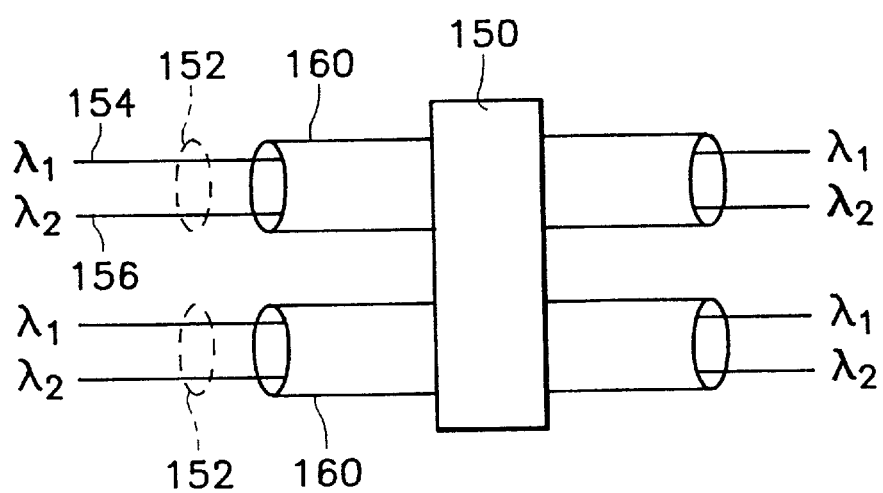
FIG. 16 is a simple representation of the basic switch module of FIG. 15.

As illustrated in the network diagram of FIG. 15, a two-wavelength 2×2 (2λ-2×2) optical switch 150 receives two pairs of optical signals at respective wavelengths $\lambda_1$, $\lambda_2$ on pairs 152 of input optical fibers 154, 156. Assuming a multi-wavelength fiber communication network, an unillustrated optical demultiplexer demultiplexes the multi-wavelength signal from one fiber to respective single-wavelength signals on the two fibers 154, 156. The pairs 152 are alternately connected, as illustrated, to two 2×2 optical switches 158, which may be the aforementioned mechanically actuated switches and which are being used as 1λ-2×2 optical switches. This switch configuration will be represented in the switching systems as shown in FIG. 16. The two fibers 154, 156 carrying signals at wavelengths $\lambda_1$, $\lambda_2$ are paired in a two-fiber bundle 160, The 2λ-2×2 switch 150 connects the two bundles 160 and selectively interchanges the signals having the same wavelength.

Such a 2λ-2×2 switch 150 can independently switch the two sets of signals of respective wavelengths $\lambda_1$, $\lambda_2$. For each wavelength, the constituent 1λ-2×2 switches 158 and hence the 2λ-2×2 switch 150 can be set in a bar state, in which the respective signals of that wavelength stays on the same optical path, or alternatively set in a cross state, in which the respective signals are switched between the two optical paths.

Figure 17:
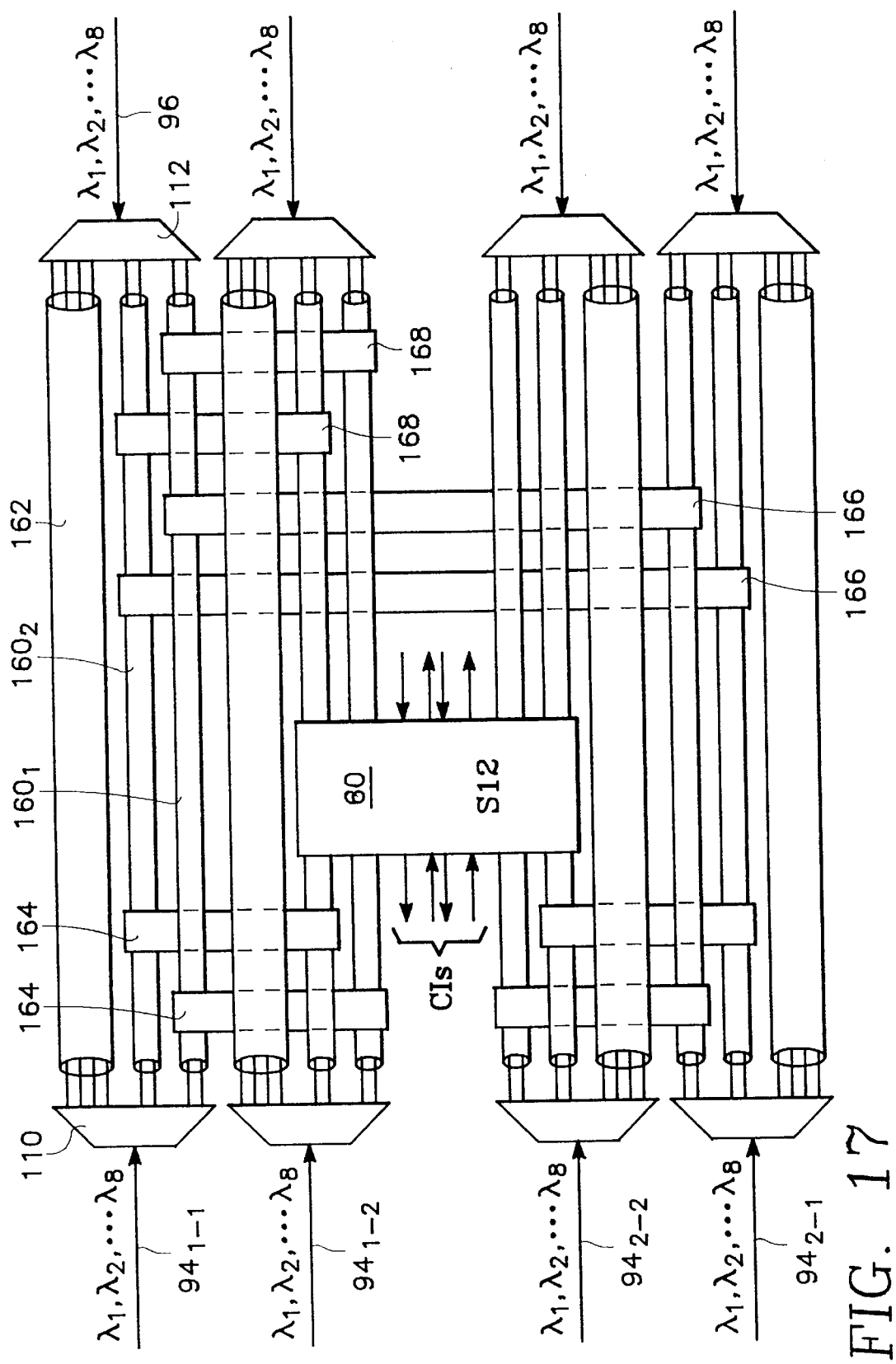
FIG. 17 is a network diagram of a full featured embodiment of an 8-wavelength hybrid wavelength-interchanging cross-connect of the invention.

A flexible hybrid WIXC utilizing such a 2λ-2×2 switch 150, particularly an opto-mechanical switch, is illustrated in the network diagram of FIG. 17. Four input fibers $94_{1-1}$, $94_{1-2}$, $94_{2-1}$, $94_{2-2}$ each carrying eight WDM channels input to respective optical demultiplexers 110. Each demultiplexer 110 outputs to eight fibers that are grouped in two two-fiber bundles $160_1$, $160_2$ and one four-fiber bundle 162. Each like numbered bundle associated with a respective input fiber carries the same wavelengths. Here it is assumed that the first two-fiber bundle $160_1$ carries the wavelengths $\lambda_1$, $\lambda_2$; the second two-fiber bundle $160_2$ carries the wavelengths $\lambda_3$, $\lambda_4$; and the four-fiber bundle 162 carries the wavelengths $\lambda_5$, $\lambda_6$, $\lambda_7$, $\lambda_8$.

The signals at $\lambda_1$, $\lambda_2$, $\lambda_3$, $\lambda_4$ associated with all four input fibers $94_{1-1}$, $94_{1-2}$, $94_{2-1}$, $94_{2-2}$ (and in the four-fiber bundles 162 of those input fibers) are not switched but are directly connected to the optical multiplexers 112 at the output.

The signals at $\lambda_5$, $\lambda_6$, $\lambda_7$ associated with all four input fibers $94_{1-1}$, $94_{1-2}$, $94_{2-1}$, $94_{2-2}$ (and in the two fiber bundles $160_1$, $160_2$ of those input fibers) may be optically switched and potentially may be electronically switched through the opto-electronic switching circuitry in the single 12-fold switching module 60. The optical switching is performed in part by pairs of input 2λ-2×2 switches 164 which are positioned before the switch 80 and which interconnect the bundles $160_1$, $160_2$ associated with either the input fibers $94_{1-1}$, $94_{1-2}$ or $94_{2-1}$, $94_{2-2}$. The signals switched toward the input fibers $94_{1-2}$, $94_{2-2}$ are input to the 12-fold switch module 60. The optical switching is also performed by intermediate 2λ-2×2 switches 166 which interconnect the two-fiber bundles $160_1$, $160_2$ between the input fibers $94_2$, $96_2$. The signals which are so switched do not participate in the electronic switching. Finally, the optical switching is also performed by output 2λ-2×2 optical switches 168 which are positioned after the opto-electronic switching circuitry 80 and which are interconnected similarly to the input 2λ-2×2 switches 164. Note that the 2λ-2×2 optical switch 164 need not be a full 4×4 switch because it needs only to switch between fiber pairs that carry the same wavelength.

The signals carried on the fibers in the two-fiber bundles $160_1$, $160_2$ associated with the input fibers $94_{1-2}$, $94_{2-2}$ pass through the input 2λ-2×2 optical switches 164 and connect as input feeds to the electronic switching circuitry 80, which is preferably implemented as two of the 12-fold switching modules as shown in FIG. 10. Optical demultiplexers in the switching modules 60 convert signals input to them to electronic form. The two modules 60 are electrically interconnected and also are connected to four pairs of electrical add/drop lines forming the client interface.

The configuration of FIG. 17 provides four optical transport interfaces through the fibers 94, 96 and four electronic client interfaces through the opto-electronic switching circuitry 80. The configuration allows nearly complete flexibility in optical switching between fibers or alternatively wavelength converting between wavelengths for the wavelengths $\lambda_1, \lambda_2, \lambda_3, \lambda_4$. The capability of doing both is limited. In three out of the four possibilities, a transparent path can be found through the switch for these wavelengths. On the other hand, the switching system can neither switch nor wavelength convert the signals at wavelengths $\lambda_5, \lambda_6, \lambda_7, \lambda_8$ but simply passes them to the corresponding output fiber 96. For these wavelengths, the switching system is transparent. Despite the limitations of the switch, it provides much capability and is composed of relatively few components. This capability can be accomplished with relatively small optical switches, such as the available opto-mechanical switch.

A related configuration uses $4\lambda$-2×2 switches instead of double the number of $2\lambda$-2×2 switches 164 as in FIG. 17 to switch between the non-converted paths and the paths passing through the opto-electronic switching circuitry 80.

Figure 18:
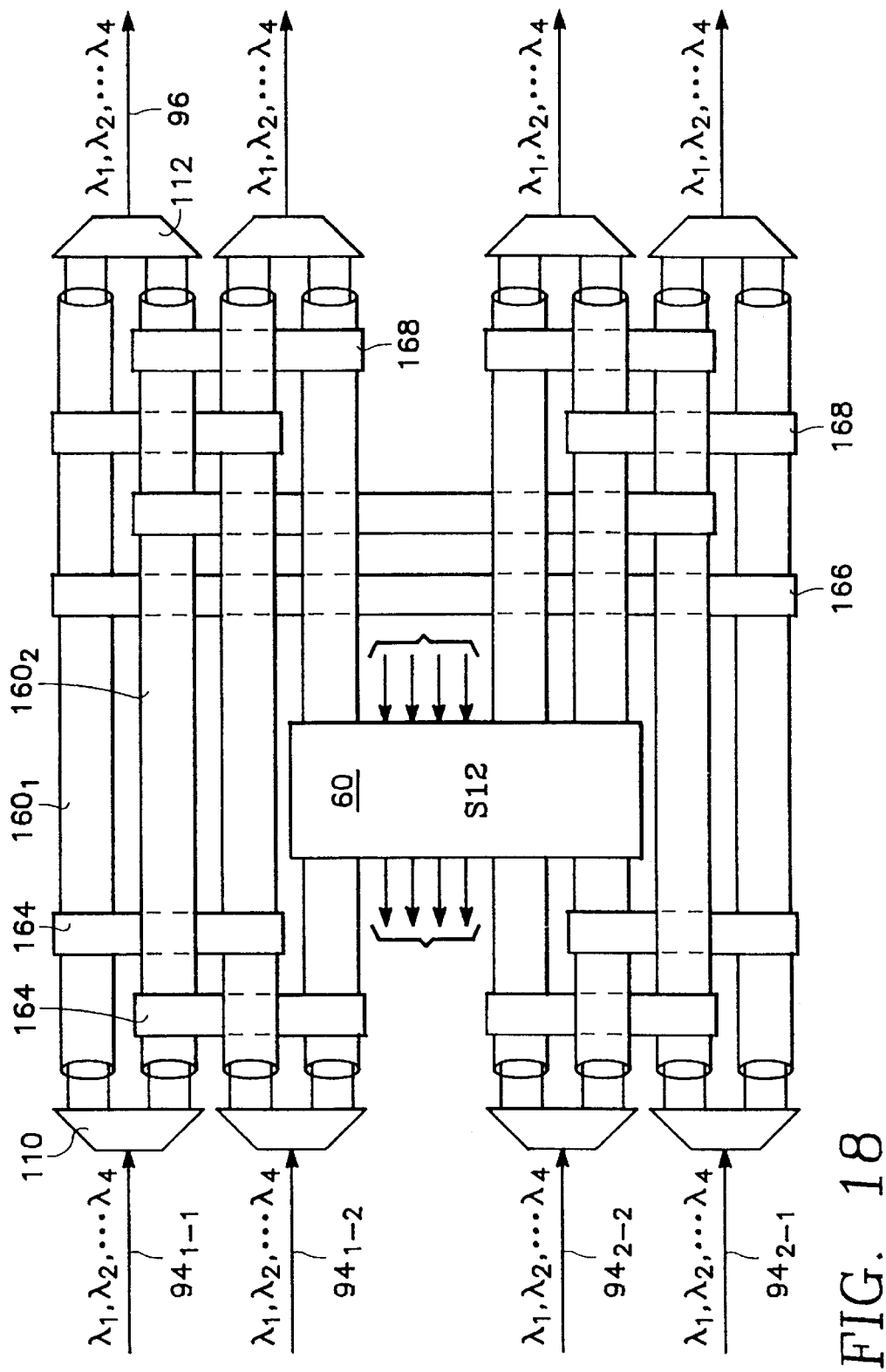
FIG. 18 is a network diagram of a 4-wavelength hybrid wavelength-hybrid wavelength-interchanging cross-connect providing additional transparent switching paths.

Virtually the same switching components as in FIG. 17 can be used for a more functionally complete switching system, illustrated in the network diagram of FIG. 18, but which is restricted to four WDM wavelengths. The input fibers $94_{1-1}, 94_{1-2}, 94_{2-1}, 94_{2-2}$ carry the wavelengths $\lambda_1, \lambda_2, \lambda_3, \lambda_4$, and 4-wavelength demultiplexers 110 demultiplex the signals on fibers associated with respective pairs of two-fiber bundles $160_1, 160_2$. Two input optical switches 164 select any of the four input wavelength signals from either of the two upper input fibers $94_{1-1}, 94_{1-2}$ for electronic switching, and two other input optical switches 164 perform the same function for the bottom two input fibers $94_{2-1}, 94_{2-2}$.

The configuration of FIG. 18 allows nearly arbitrary transparent optical switching or opaque wavelength conversion for four WDM wavelengths.

Figure 19:
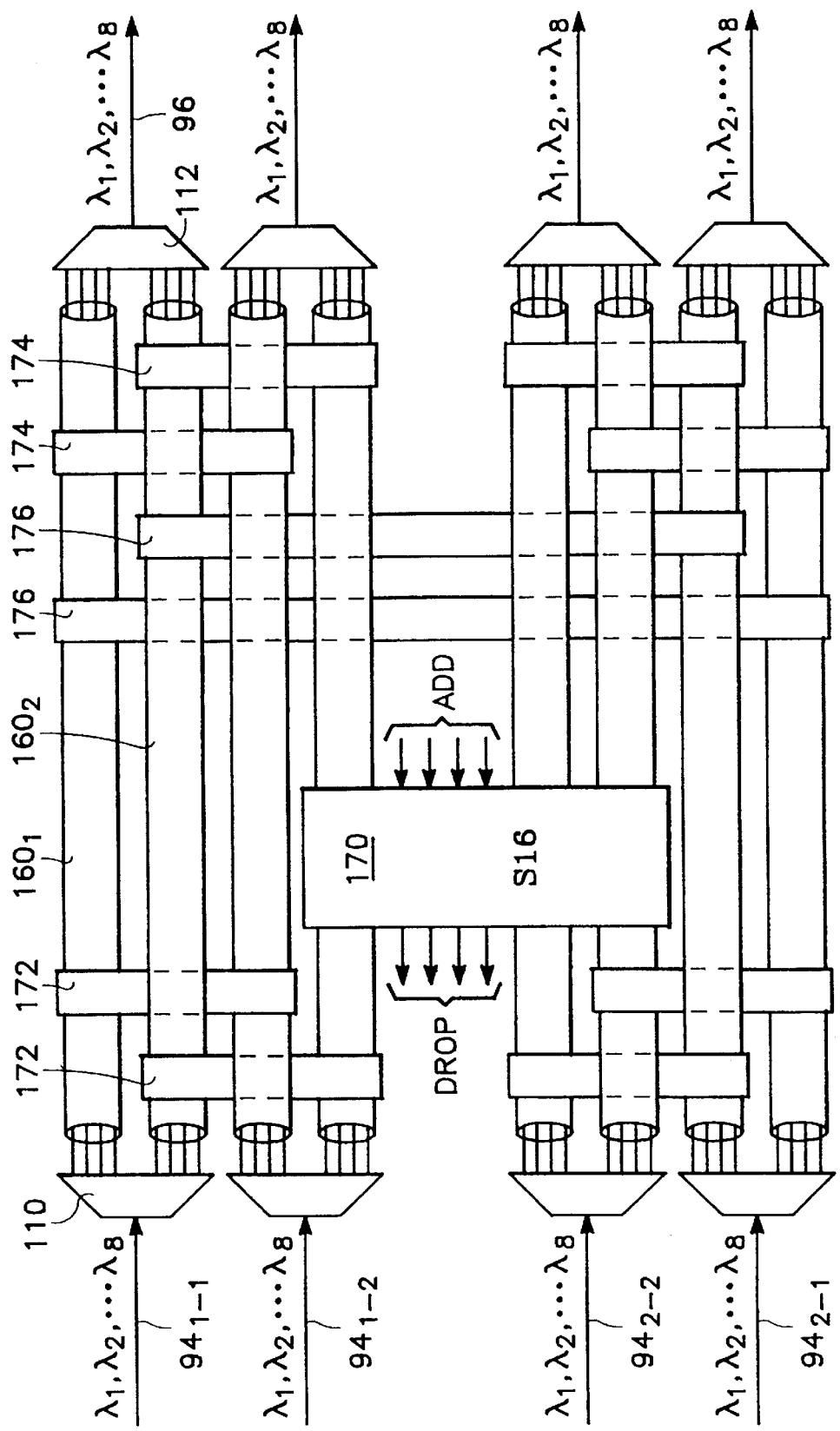
FIG. 19 is a network diagram of an 8-wavelength version of the WIXC of FIG. 18.

The configuration of FIG. 18 may be upgraded, as illustrated in the network diagram of FIG. 19, to allow switching and wavelength interchange among all eight WDM wavelengths. It requires a larger opto-electronic switching circuitry 170, to be described later. The four input fibers $94_{1-1}, 94_{1-2}, 94_{2-1}, 94_{2-2}$, each carrying eight WDM wavelengths, input to 8-fold optical demultiplexers 110. A first four-fiber bundle 162, includes four fibers which receive from the respective demultiplexer 10 the four demultiplexed wavelengths $\lambda_1, \lambda_2, \lambda_3, \lambda_4$ while a second four-fiber bundle 1622 has four fibers which receive the other four demultiplexed wavelengths $\lambda_5, \lambda_6, \lambda_7, \lambda_8$. Four input 8×8 optical switches 172, operating as a 16-fold switching module $4\lambda$-2×2 switches disposed before the 170 selectively switch signals between the four-fiber bundles $162_1, 162_2$ either at the top or bottom of the switching system, that is, between the four-fiber bundles associated with input fibers $94_{1-1}, 94_{1-2}$ or with input fibers $94_{2-1}, 94_{2-2}$. Four output 8×8 optical switches 174 disposed after the digital switching circuitry 170 perform similar switching. Two intermediate 8×8 optical switches 176 disposed in parallel to the opto-electronic switching circuitry 170 selectively switch signals between the top and bottom fiber bundles $162_1, 162_2$ which do not enter the digital switching circuitry 170, that is, between the bundles $162_1, 162_2$ associated with input fibers $94_{1-1}, 94_{2-1}$. The digital switching circuitry 170 receives sixteen fibers in the other fiber bundles $162_1, 162_2$ associated with input fibers $94_{1-2}, 94_{2-2}$ and outputs on corresponding output fibers.

Figure 20:
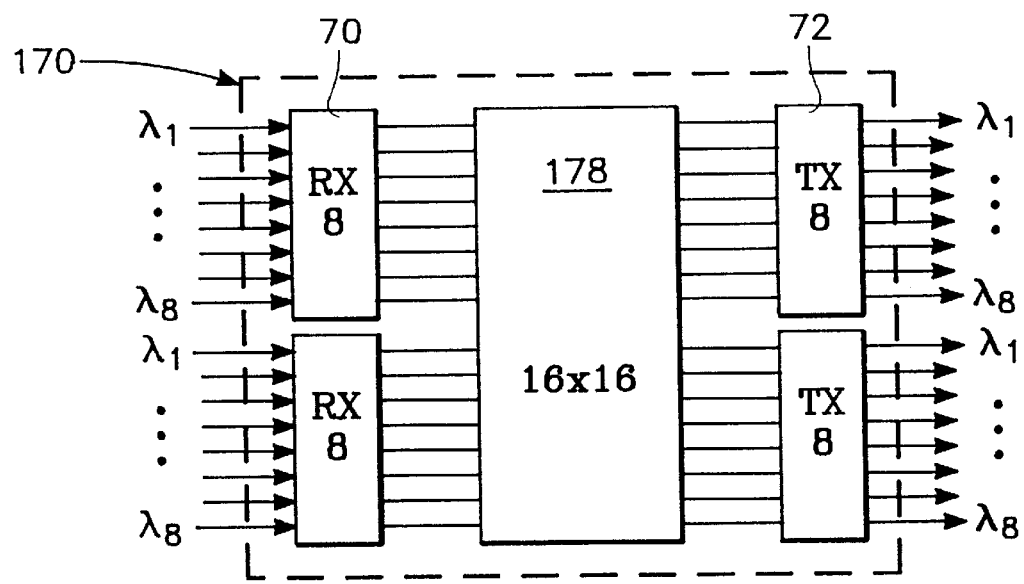
FIG. 20 is a circuit diagram of an opto-electronic switching module.

The digital switching circuitry 170, as illustrated in FIG. 20, includes a pair of 8-fold receiver arrays 70 and a pair of 8-fold transmitter arrays 72 providing an electronic interface to a 16×16 electronic switch 178. This allows the opaque wavelength conversion of a larger number of WDM wavelengths than in the circuitry of FIG. 19, but there are no add/drop lines. In this configuration, the digital switching circuitry 170 acts as a non-blocking tandem switch.

Figure 21:
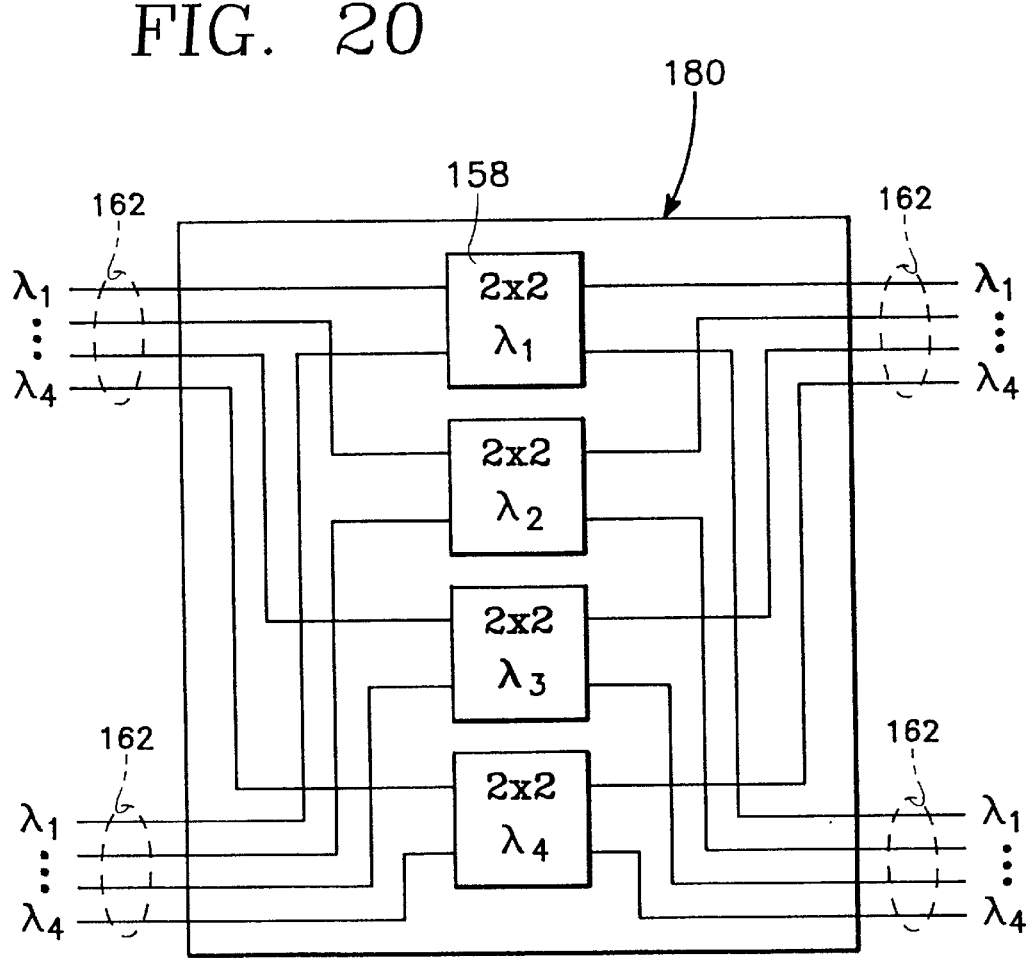
FIG. 21 is a circuit diagram of a four-wavelength basic switch module.

The 8×8 optical switches 172, 174, 176 of FIG. 19 may be based upon the mechanically actuated switches, which were previously discussed. As illustrated in the circuit diagram of FIG. 21, two bundles 162 of four fibers carrying four respective wavelengths, either $\lambda_1, \lambda_2, \lambda_3, \lambda_4$ or $\lambda_5, \lambda_6, \lambda_7, \lambda_8$, input to a $4\lambda$-2×2 switch 180 which principally consists of four mechanically actuated $1\lambda$-2×2 optical switches 158, each switch 158 being dedicated to one wavelength. The fibers in the two four-fiber bundles 162 are routed to the two input ports of the $1\lambda$-2×2 switch 158 of the corresponding wavelengths. The two outputs of the four $1\lambda$-2×2 switches 158 are routed back to the two bundles 162. It is to be appreciated that the $4\lambda$-2×2 optical switch 180 of FIG. 21 simply doubles the $2\lambda$-2×2 optical switch 150 of FIG. 15.

Figure 22:
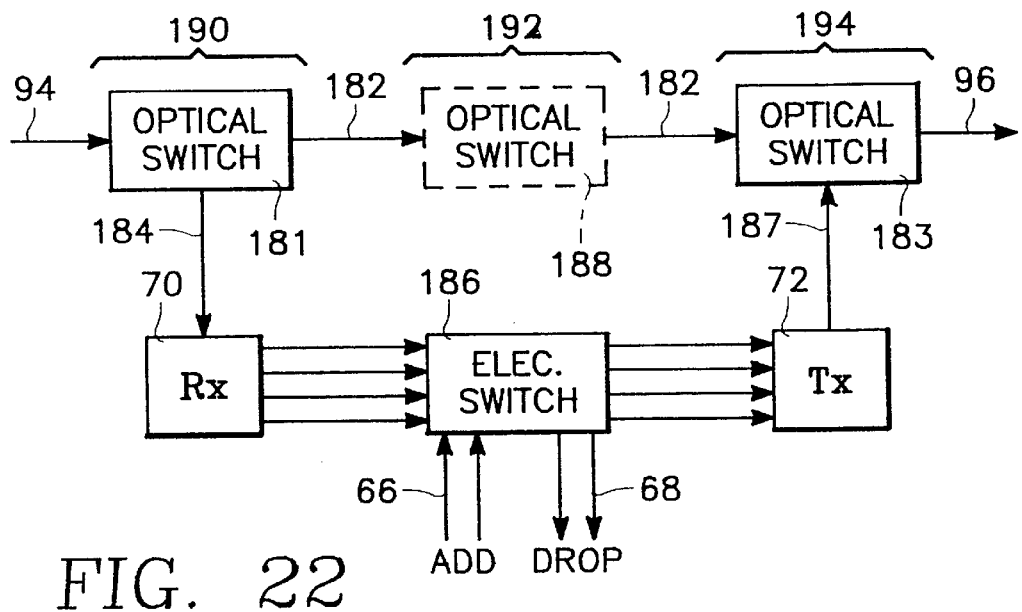
FIG. 22 is a conceptualized network diagram of several embodiments of the invention.

The large number of embodiments presented above can be commonly conceptualized as the switching network illustrated in the network diagram of FIG. 22. One or more input fibers 94 or other optical paths carrying multiple signals input to at least one input optical switch 181 which selectively switches the optical signals to either a transparent path 182 to an output optical switch 183 or an optical path 184 to the receiver array 70. The receiver array 70 accepts multiple optical inputs and converts them to multiple electrical signals carried on electrical lines to an electronic switch 185, which also receives electronic add lines 66 and transmits to electrical drop lines 68. Multiple electrical outputs of the electrical switch 186 are connected to the transmitter array 72 which converts the electrical signals to respective optical signals on an optical path 187 to the output optical switch 183. The electronic switch 186 can switch any of the inputs from the receiver array 70 or the add lines 66 to any of the outputs to the transmitter array 72 or the drop lines 68. Included along the transparent optical path 182 between the input and output optical switches 181, 183 may be an optional intermediate optical switch 188 which transparently switches between signals of the same wavelength on multiple physical paths included in the transparent optical path 182. The output optical switch 183 switches optical signals on its two inputs 182, 187 to one or more output fibers 96. The switching network can be divided into: an input section 190 including the input optical switch; an intermediate section 192 including the optional intermediate optical switch 188, the electronic switch 186, and its receiver and transmitter arrays 70, 72; and an output section 194 including the output optical switch 183.

An algorithm will now be developed to methodically route a signal through the hybrid $4\lambda$-4×4 wavelength-interchanging cross-connect of FIG. 22. This figure is redrawn and differently labeled in FIG. 23. The four input fibers 94 are labeled A, B, C, D and the sixteen fibers onto which their WDM signals are demultiplexed are labeled $A_i, B_i, C_i, D_i$, where the capital refers to the input fiber and the subscript refers to one of the four wavelengths $\lambda_1, \lambda_2, \lambda_3, \lambda_4$. The four output fibers 96 are paired with the input fibers 94 in the fashion obvious from FIG. 18, and the same labeling is applied as to the input fibers. That is, an unswitched optical signal is passed from an input fiber to a similarly numbered output fiber. These fibers will now be referred to as ports. The 12-fold opto-electronic switching module 60 has add/drop lines which will be referred to respectively as input ports and output ports, both designated as $E_i$. Since there are four add lines and four drop lines, one of the four WDM wavelengths may for convenience be assigned to each of them although the color is meaningless. The opto-electronic switching module 60 includes two 4-fold receiver arrays 70 and two 4-fold transmitter arrays 72 for interfacing the optical fibers to the electronic switching. The various ports are labeled in FIG. 23.

The algorithm must find a route through the switching system from any optical input port to any optical output port. Let the input port be identified by a 5-bit vector $X=(x_1, x_2, x_3, x_4, x_5)$ and the output port by a 5-bit vector $Y=(y_1, y_2, y_3, y_4, y_5)$, where the value of the bits are given in TABLE 1.

| PORT | $x_5/y_5$ | $x_4/y_4$ | $x_3/y_3$ | $x_2/y_2$ | $x_1/y_1$ |
|---|---|---|---|---|---|
| $A_1$ | 0 | 0 | 0 | 0 | 0 |
| $A_2$ | 0 | 0 | 0 | 0 | 1 |
| $A_3$ | 0 | 0 | 0 | 1 | 0 |
| $A_4$ | 0 | 0 | 0 | 1 | 1 |
| $B_1$ | 0 | 0 | 1 | 0 | 0 |
| $B_2$ | 0 | 0 | 1 | 0 | 1 |
| $B_3$ | 0 | 0 | 1 | 1 | 0 |
| $B_4$ | 0 | 0 | 1 | 1 | 1 |
| $C_1$ | 0 | 1 | 0 | 0 | 0 |
| $C_2$ | 0 | 1 | 0 | 0 | 1 |
| $C_3$ | 0 | 1 | 0 | 1 | 0 |
| $C_4$ | 0 | 1 | 0 | 1 | 1 |
| $D_1$ | 0 | 1 | 1 | 0 | 0 |
| $D_2$ | 0 | 1 | 1 | 0 | 1 |
| $D_3$ | 0 | 1 | 1 | 1 | 0 |
| $D_4$ | 0 | 1 | 1 | 1 | 1 |
| $E_1$ | 1 | x | x | 0 | 0 |
| $E_2$ | 1 | x | x | 0 | 1 |
| $E_3$ | 1 | x | x | 1 | 0 |
| $E_4$ | 1 | x | x | 1 | 1 |

The two least significant bits are used to indicate the four wavelengths. The next two bits indicate the four fibers and are of no significance for the add/drop ports. A positive significant bit indicates that the input or output port is an add/drop port.

Figure 23:
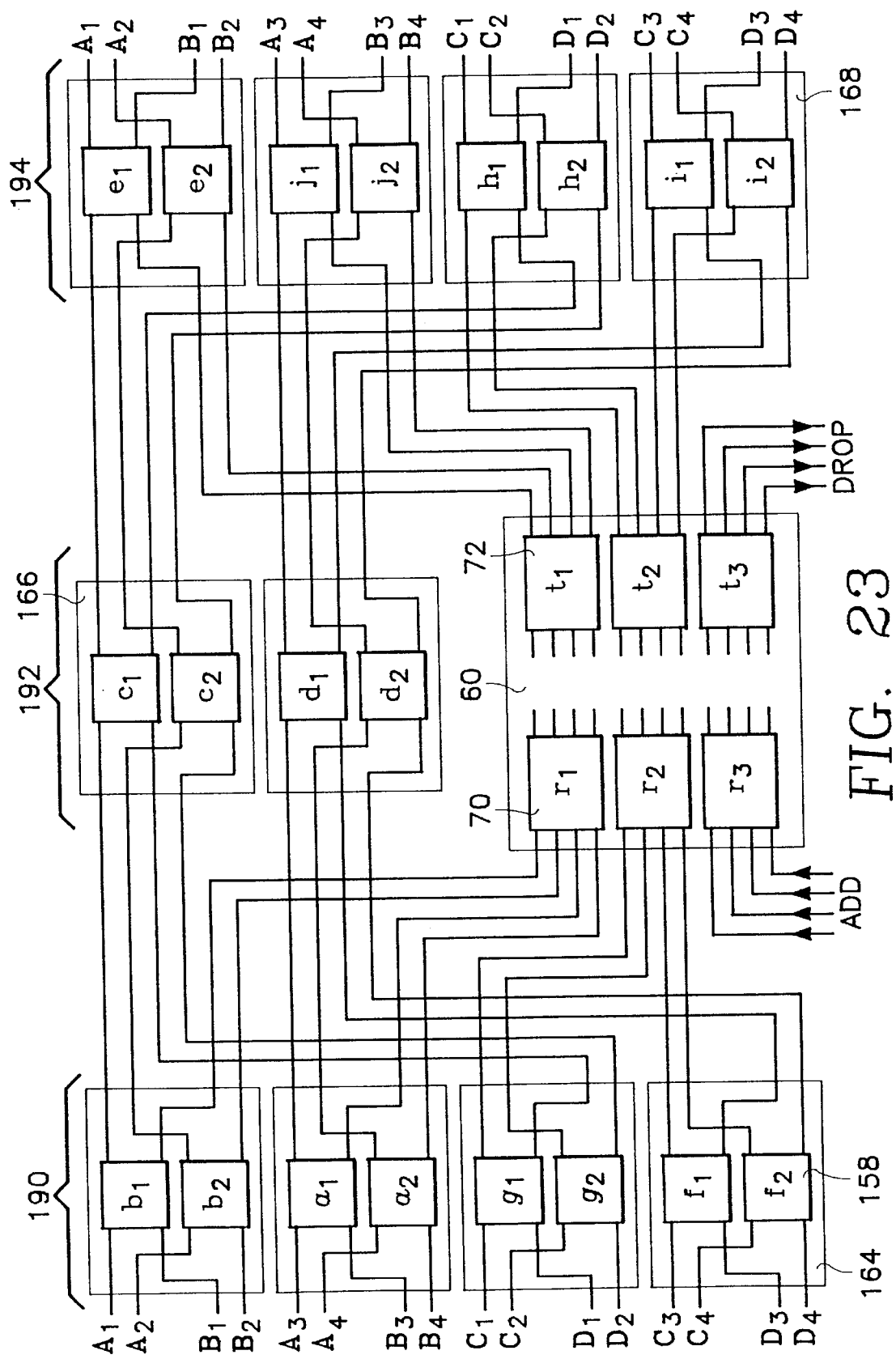
FIG. 23 is an alternative circuit diagram to that of FIG. 18.

The internal structure of the wavelength-interchanging cross-connect of FIGS. 22 and 23 can be divided into an input section 190, an intermediate section 192, and an output section 194. The input section 190 includes the four 2λ-2×2 optical switches 164, each comprising two 1λ-2×2 optical switches 158. The nomenclature will change to switching block 164 and bar-cross switch 158 in view of the two states the switch 158 can assume. The bar-cross switches 158 in the input section 190 are individually identified as $a_1, a_2, b_1, b_2, f_1, f_2, g_1, g_2$ as shown in figure. Similarly, the output section 194 includes four switching blocks 192 contain eight bar-cross switches 158 individually identified as $e_1, e_2, h_1, h_2, i_1, i_2, j_1, j_2$ as shown in the figure.

The intermediate section 192 includes the two switching blocks 166 containing four bar-cross switches 158 individually identified as $c_1, c_2, d_1, d_2$ as shown in the figure. The intermediate section 192 also includes the 12-fold opto-electronic switching module 60 which has twelve input and twelve output lines. Of the twelve input or output lines, eight optical lines are used for transport interface and four electrical lines are used for client interface, that is, add/drop lines. The lines are continuous into the electronic switching portion of the opto-electronic switching circuitry 60 and will be referred to as the electronic ports. The electronic input ports will be identified by a 4-bit vector $WI(wi_1, wi_2, wi_3, wi_4)$ and the electronic output ports will be identified by a 4-bit vector $WO(wo_1, wo_2, wo_3, wo_4)$. The correspondence between electronic port number and the bits of the two vector is given in TABLE 2.

TABLE 2

| ELEC. PORT | $wi_4/wo_4$ | $wi_3/wo_3$ | $wi_2/wo_2$ | $wi_1/wo_1$ |
|---|---|---|---|---|
| 1 | 0 | 0 | 0 | 0 |
| 2 | 0 | 0 | 0 | 1 |
| 3 | 0 | 0 | 1 | 0 |
| 4 | 0 | 0 | 1 | 1 |
| 5 | 0 | 1 | 0 | 0 |
| 6 | 0 | 1 | 0 | 1 |
| 7 | 0 | 1 | 1 | 0 |
| 8 | 0 | 1 | 1 | 1 |
| 9 | 1 | 0 | 0 | 0 |
| 10 | 1 | 0 | 0 | 1 |
| 11 | 1 | 0 | 1 | 0 |
| 12 | 1 | 0 | 1 | 1 |

The first eight electronic ports will be associated with the fiber paths within the switching system while the last four electronic ports will be associated with the add/drop lines.

The control algorithm receives a command to make a connection between an input port identified by the input vector X and an output port identified by the output vector Y. This combination specifies both spatial switching and any wavelength conversion and the add/drop lines are included in the combination. The operation of the algorithm can be broken down into a number of steps illustrated in the flow diagram of FIG. 24. In step 200, the input bar-cross switch is selected based on the input vector X. In step 202, the state of that selected input bar-cross switch is set dependent upon both the input and output vectors X and Y. Similarly, in step 204, the output bar-cross switch is selected based on the output vector Y, and in step 206 the state of the selected bar-cross switch is set based upon both the input and output vectors X and Y. In step 208, the intermediate bar-cross switch is selected if necessary based upon the input and output vectors X and Y. In step 210, the state of the selected intermediate bar-cross switch is set based on both the input and output vectors X and Y. In step 212, the opto-electronic switching circuitry 60 is selected if necessary based upon the input and output vectors X and Y and in step 214, the state of the opto-electronic switching circuitry 64 is set based on the input and output vectors X and Y.

For a connection that retains the same wavelength, two paths exist through the switching network. The path can be transparent through the intermediate optical switch 166 or can proceed through the opto-electronic switching circuitry 60, which, in this case, is set to transmit on the wavelength at which it receives. The algorithm will not specifically address the second possibility, and it is implicitly assumed that the transparent path will be used if no wavelength conversion is required although the algorithm and switching system are not so limited.

The selection of the input or output bar-cross switches in steps 200 and 204 is straightforward. There is a one-to-one relationship between the input/output port and the input/output bar-cross switches, which relationship can be included in a look-up table. Alternatively, the bit assignments of TABLE 1 can be used in a sub-algorithm which first determines from the highest-order bit that a fiber port is being selected and then selects a switching block from the second and fourth bit and then selects the bar-cross switch within that switching block from the lowest-order bit.

Figure 25:
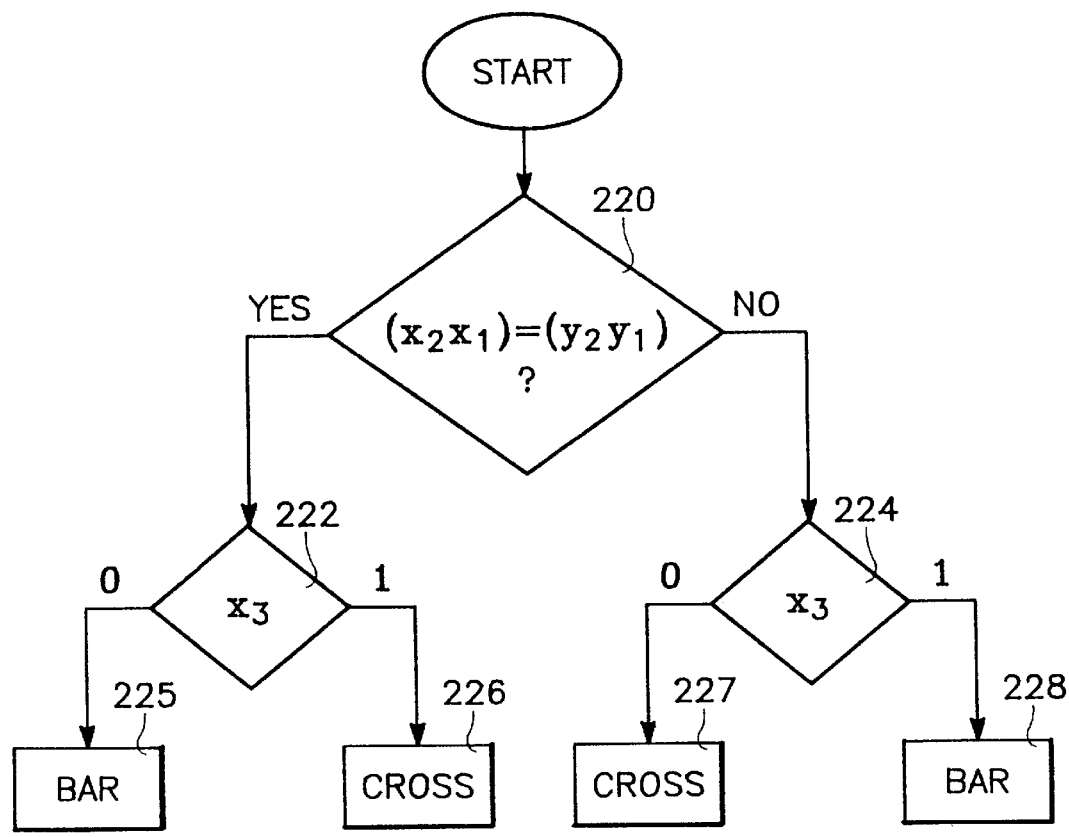
FIGS. 25 and 26 are flow diagrams for two sub-algorithms forming part of the algorithm of FIG. 23 for a four-wavelength hybrid wavelength-interchanging cross-connect.

A sub-algorithm for determining the state of the selected input bar-cross switch, as done in step 202, is illustrated in the flow diagram of FIG. 25. In test 220, the two lowest-order bits of the input and output vectors are compared, that is, does $(x_2,x_1)$ equal $(y_2, y_1)$. Equality of the bits means that the color is maintained between input and output. If the two bits are the same between the input and output vectors, in test 222 the value of the third bit $x_3$ of the input vector X is determined. If it is zero, in step 225, the bar-cross switch is set in its bar state. It if is a one, in step 226, the bar-cross switch is set in its cross state. Both these steps 225, 226 direct the signal toward the transparent path through the intermediate optical switches 166. Conversely, if either of the lowest two bits differ between the input and output vectors X and Y, the third input bit $x_3$ is determined in test 224, but the state of the bar-cross switch is set oppositely in steps 227, 228 relative to steps 225, 226. The latter steps 227, 228 direct the signals on the opaque path through the opto-electronic switching circuitry 64.

A sub-algorithm for determining the state of the selected output bar-cross switch, as done in step 206, closely follows the sub-algorithm of FIG. 25 with the exception that the value of the third bit y 3 of the output vector Y is determined in tests 222 and 224.

Figure 26:
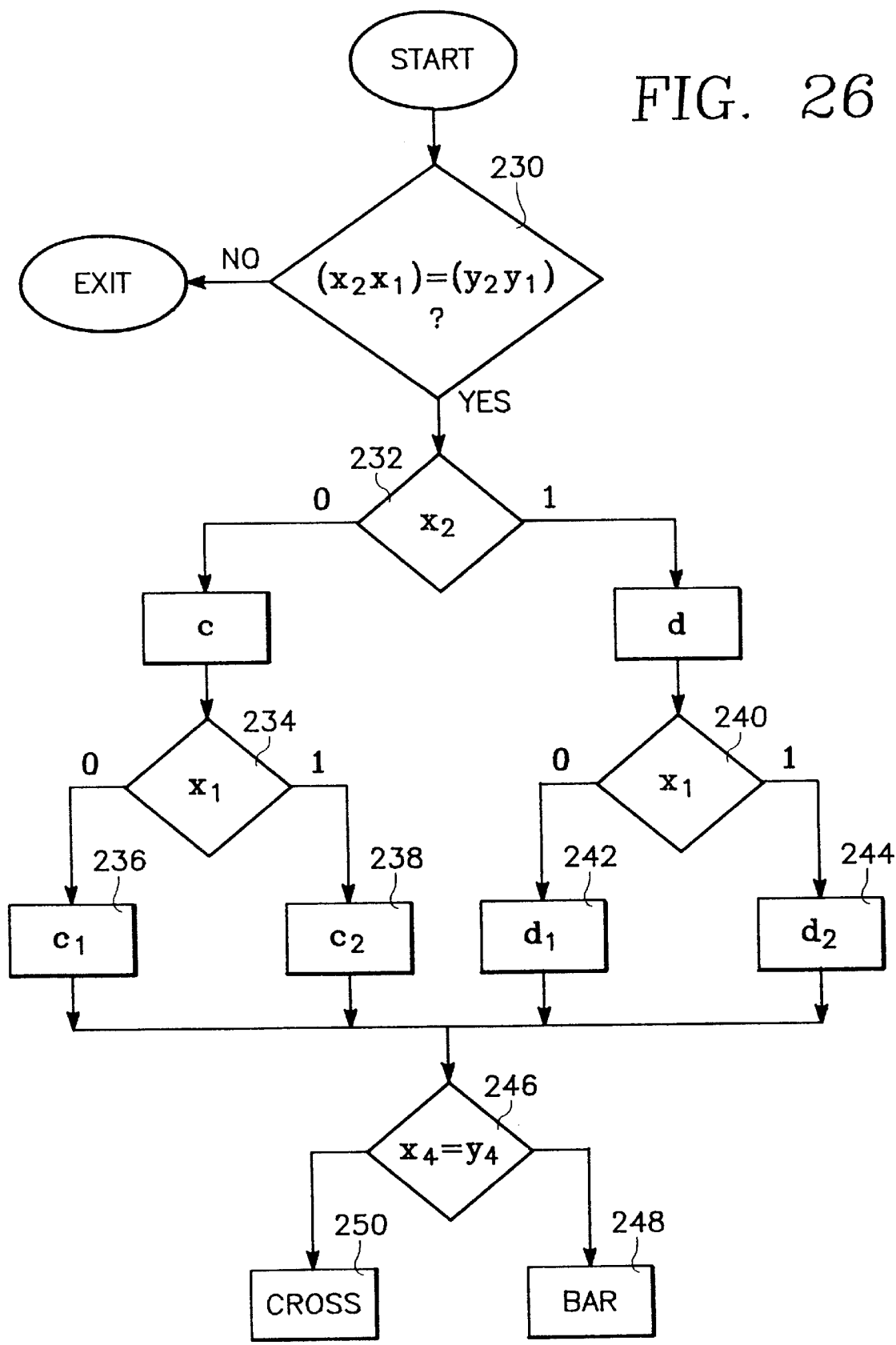

A sub-algorithm for selecting a bar-cross switch in the intermediate section 192, as done in steps 208, 210, is illustrated in the flow diagram of FIG. 26. In test 230, the two lowest bits $(x_2, x_1)$ and $(y_2, y_1)$ of the input and output vectors X and Y are compared. If they are not equal, wavelength conversion is required so that the intermediate optical switches are not used in this connection but the connection must lead through the opto-electronic switching circuitry. Under this condition, the sub-algorithm is immediately terminated. If the two sets of bits are equal, that is, no wavelength conversion is required, a test 232 of the second input bit $x_2$ determines which of the two switching blocks is selected. A zero value means that the "d" switching block is selected, and a test 234 determines the value of the lowest-order bit $x_1$ of the input vector. If it is zero, the $c_1$ bar-cross switch is selected in step 236, but, if it is a one, the $c_2$ bar-cross switch is selected in step 238. Similarly, if test 232 determines a value of one for $x_2$, the "d" switching block is selected, and a test 240 determines the value of the lower-order bit $x_1$. If it is zero, the $d_1$ bar-cross switch is selected in step 242, but, if it is a cone, the $d_2$ bar-cross switch is selected in step 242.

Following selection of the intermediate bar-cross switch, its state is set. Test 246 compares the fourth bits $x_4$ and $y_4$ of the input and output vectors. If they are equal, in step 248, the selected bar-cross switch is set in the bar state. If they are not equal, in step 250 it is set in the cross state.

Figure 24:
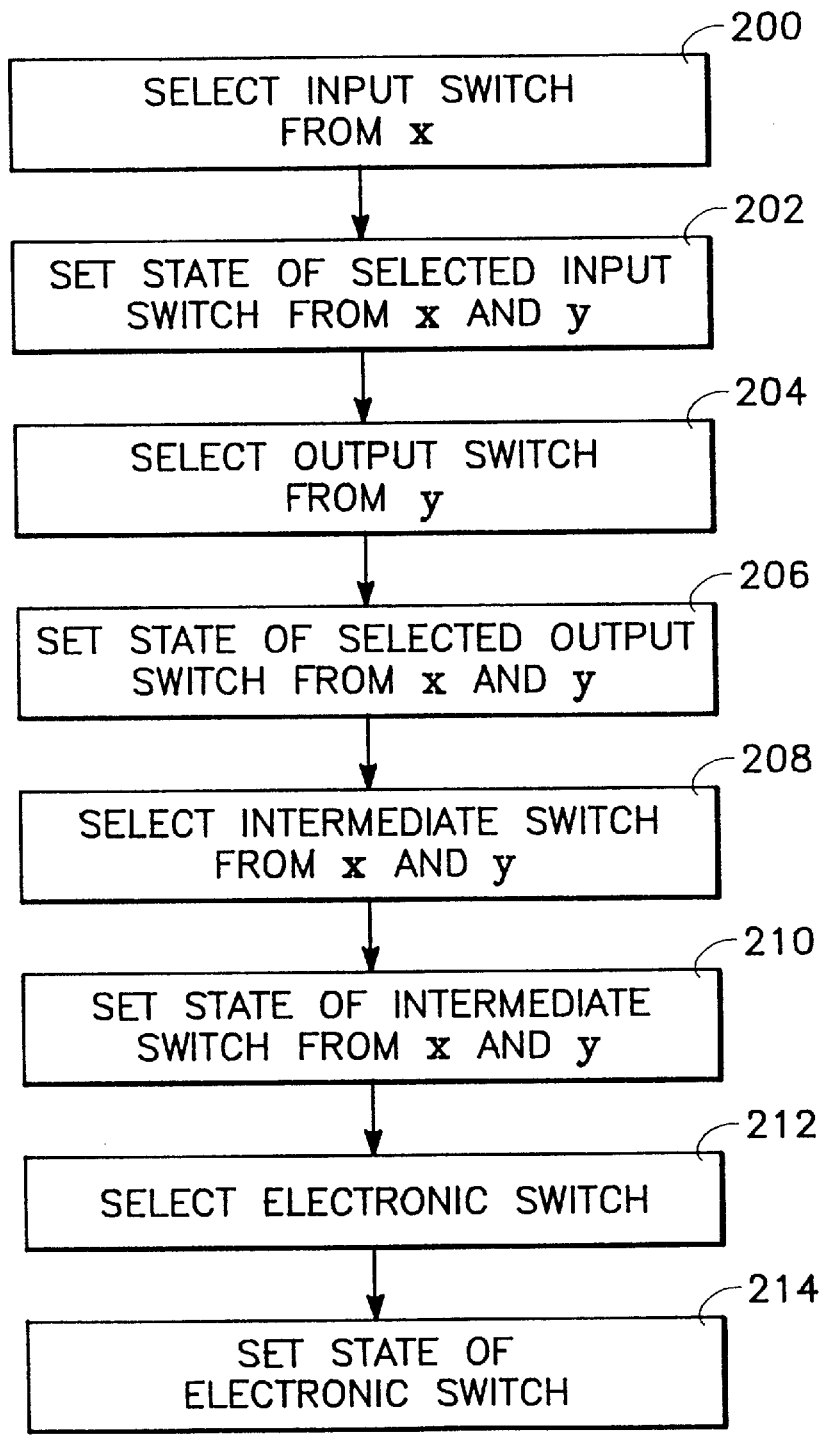
FIG. 24 is a flow diagram for an algorithm to set up a connection in a hybrid wavelength-interchanging cross-connect.

In step 212 of FIG. 24, the opto-electronic switching circuitry 64 and its embedded electronic switch is selected under two conditions. First, if the highest-order bit $x_5$ or $y_5$ of the input or output vectors A or B is equal to one, then one of the drop/add lines is designated as a port, whether as an input or an output. Secondly, if the two lowest-order bits $(x_2, x_1)$ and $(y_2, y_1)$ do not agree, then the input wavelength differs from the output wavelength and the opto-electronic switching circuitry 64 must convert the wavelength. Additionally, it may be desired to use the path through the opto-electronic switching circuitry 64 in other circumstances such as congestion, but the present algorithm does not so provide. If the opto-electronic switching circuitry 64 has been selected for a new connection, the electronic input and output vectors WI and WO are formed by selected bits $x_1$, $y_1$ of the optical input and output vectors X and Y according to the associations of TABLES 2 and 3.

TABLE 3

| $wi_4$ | $wi_3$ | $wi_2$ | $wi_1$ |
|---|---|---|---|
| $x_5$ | $x_4$ | $x_2$ | $x_1$ |

TABLE 4

| $wo_4$ | $wo_3$ | $wo_2$ | $wo_1$ |
|---|---|---|---|
| $y_5$ | $y_4$ | $y_2$ | $y_1$ |

The electronic input and output vectors WI and WO are used principally for setting the state of the 12×12 electronic switch embedded int he opto-electronic circuitry 64.

The algorithm presented above can be generalized to a larger number of WDM wavelengths. Also, although the algorithm was phrased in terms proper to the mechanically actuated optical switch, it is easily extended to a multi-wavelength switch by identifying each of the bar-cross switches 158 with one wavelength plane within the multi-wavelength switch. Further, the algorithm is directly usable with WDM add/drop lines since the separate electrical add/drop lines already are identified with a color.

The invention thus provides a cross-connect having the capabilities of both wavelength conversion for optical signals and transparent optical paths for optical signals not requiring wavelength conversion. The cross-connect can be realized with relatively simple components that are already commercially available. The design of the cross-connect may be varied depending on the number of wavelengths, the number of fibers, and whether all signals may require wavelength translation or require transparent switching without translation.

What is claimed is:

1. A hybrid wavelength-interchanging cross-connect, comprising:
   a first optical switch receiving at least one optical signal on an input path and having at least first and second output ports;
   a second optical switch having at least first and second input ports and at least one optical output;
   an optical path between said first output port of said first optical switch and said first input port of said second optical switch;
   a third optical switch receiving at least one optical signal on a second input path and having at least third and fourth output ports;
   a fourth optical switch having at least third and fourth input ports and at least one optical output;
   a second optical path between said third output port of said third optical switch and said third input ports of said fourth optical switch;
   an opto-electronic switch comprising:
      an electronic switching fabric,
      a receiver for converting respective optical signals from said second and fourth output ports of said respectively first and third optical switches to respective electronic signals, said receiver connected to said electronic switching fabric,
      a transmitter converting respective electronic signals from said electronic switching fabric to respective optical signals to be respectively provided to said second and fourth input ports of said respective second and fourth optical switch,
      an add line input receiving an electronic signal from an add line, said add line input connected to said electronic switching fabric, and a drop line output outputting an electronic signal to a drop line from said electronic switching fabric, wherein said signals of said first and second optical paths may be selectively switched.

2. The hybrid wavelength-interchanging cross-connect of claim 1, wherein the first and second optical paths are connected via a fifth optical switch in parallel with the opto-electronic switch.

3. The hybrid cross-connect of claim 1, wherein said first and second switches are mechanically actuated.

4. The hybrid cross-connect of claim 1, wherein said first and second optical switches are multiwavelength optical switches selectively switching one or more of a plurality of wavelength-separated signals.

5. The hybrid cross-connect of claim 4, wherein said multi-wavelength optical switches comprises liquid-crystal switches.

* * * * *